United States Patent
Shirakawa

(10) Patent No.: US 8,964,109 B2
(45) Date of Patent: Feb. 24, 2015

(54) IMAGE PROCESSING DEVICE AND METHOD

(71) Applicant: JVC KENWOOD Corporation, Yokohama-shi, Kanagawa (JP)

(72) Inventor: Ryuji Shirakawa, Yokohama (JP)

(73) Assignee: JVC KENWOOD Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 14/074,862

(22) Filed: Nov. 8, 2013

(65) Prior Publication Data

US 2014/0152867 A1 Jun. 5, 2014

(30) Foreign Application Priority Data

Dec. 3, 2012 (JP) ................................ 2012-264075

(51) Int. Cl.
*H04N 5/222* (2006.01)
*H04N 5/235* (2006.01)
*H04N 5/232* (2006.01)

(52) U.S. Cl.
CPC ......... *H04N 5/2357* (2013.01); *H04N 5/23232* (2013.01); *H04N 5/235* (2013.01); *H04N 5/2351* (2013.01)
USPC .......................................................... 348/370

(58) Field of Classification Search
USPC ................................ 348/370–376; 396/61–62
See application file for complete search history.

(56) References Cited

U.S. PATENT DOCUMENTS

2009/0167928 A1* 7/2009 Asukabe et al. .............. 348/345
2012/0026359 A1* 2/2012 Fukushima et al. ....... 348/226.1

FOREIGN PATENT DOCUMENTS

| JP | 2010-213220 A | 9/2010 |
| JP | 2011-15222 A | 1/2011 |
| JP | 2011-101208 A | 5/2011 |

* cited by examiner

*Primary Examiner* — Mekonnen Dagnew
(74) *Attorney, Agent, or Firm* — Nath, Goldberg & Meyer; Jerald L. Meyer; Katelyn J. Bernier

(57) ABSTRACT

A flash detection unit is configured to detect whether or not each frame of image data includes a high luminance portion due to a flash. A holding unit is configured to hold a past frame of the image data. A correction processing unit is configured to, if it is detected by the flash detection unit that frames include high luminance portions, correct the image data so as to consolidate a first image data and a second image data into one frame. The first image data is included in a first portion in a first frame stored in the holding unit. The second image data is included in a second portion in a second frame which is adjacent to the first frame. The first and second portions are high luminance portions.

6 Claims, 17 Drawing Sheets

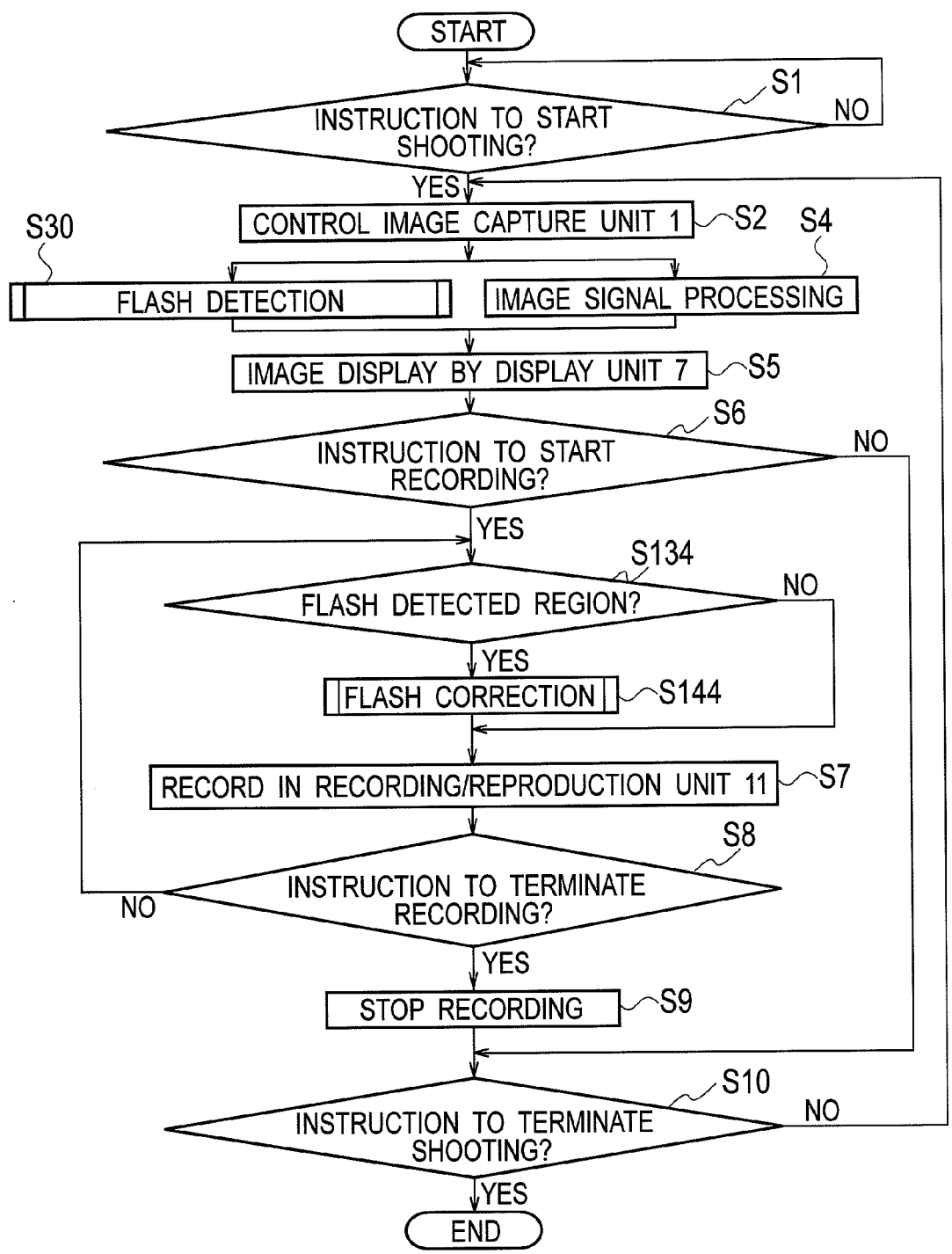

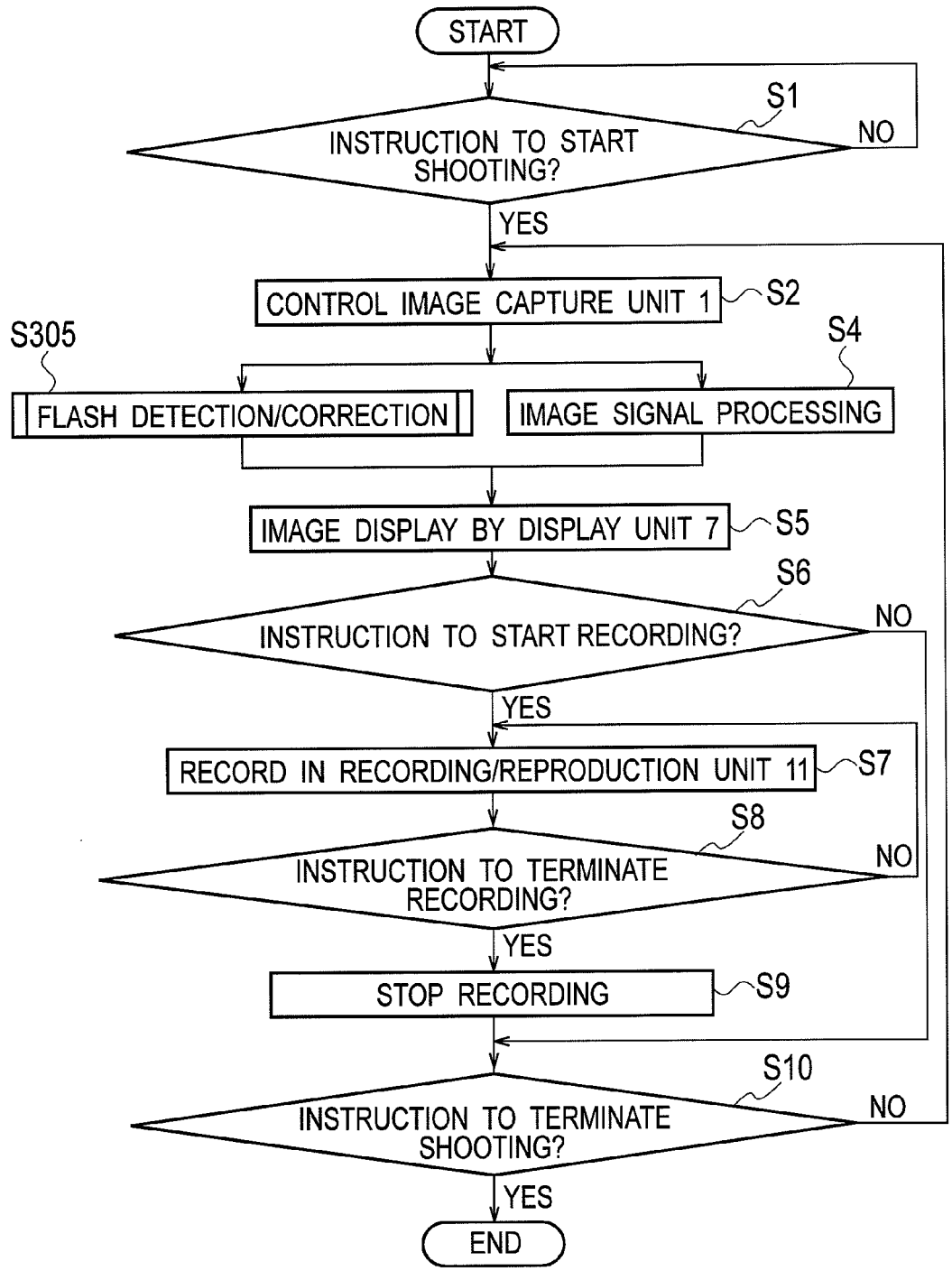

IMAGE PROCESSING DEVICE AND METHOD

CROSS REFERENCE TO RELATED APPLICATION

This application is based upon and claims the benefit of priority under 35 U.S.C. §119 from Japanese Patent Application No. P2012-264075, filed on Dec. 3, 2012, the entire contents of which are incorporated herein by reference.

BACKGROUND

Embodiments relate to an image processing device and method which can reduce the feeling of strangeness due to a discontinuity in image brightness in a frame which is caused by the camera flash of a person other than the person who is taking the moving image.

In recent years, imaging devices such as video cameras often employ CMOS (complementary metal oxide semiconductor) sensors. Reading of imaging signals by the CMOS sensors is performed by the rolling shutter method performing reset, exposure, and reading of the pixels not all at one time but sequentially, line-by-line. In this method, the reading timing is sequentially shifted in the line direction.

At a wedding ceremony or the like, for example, many video cameras and still cameras take images of the same subject at the same time. In such a case, short bursts of strong light from the flash of other cameras are sometimes incident on the CMOS sensors during exposure of only a partial number of lines in a frame.

Accordingly, the amount of exposure is not consistent, thus producing a bright area (like a white band) in the frame which causes a discontinuous image. The problem is caused not only by light from camera flashes but also in the case where strong light similar to that of a flash is incident on CMOS sensors for a short period.

There are propositions of various types of solutions for this problem as described in Japanese Patent Laid-open Publications Nos. 2010-213220, 2011-15222, and 2011-101208, for example.

SUMMARY

Correcting an image portion where discontinuous brightness is caused by a flash, results in an image substantially the same as an image with no flash. However, making the image substantially the same as an image with no flash could have the effect of spoiling an image which has been taken under the circumstance where a flash has deliberately been used.

Therefore, there is a demand for intentionally keeping an image in the state where a flash has deliberately been used, so that in this situation, the image is not spoiled.

On the other hand, an image which has a discontinuity in image brightness in a frame due to an external flash can cause a feeling of strangeness. Therefore, there is a demand for reducing the feeling of strangeness.

An object of the embodiments is to provide an image processing device and method which are capable of reducing the feeling of strangeness due to a discontinuity in image brightness in a frame which is caused by an external flash, without spoiling images which have been taken under the circumstance where a flash has deliberately been used.

To solve the aforementioned conventional technical problem, a first aspect of the embodiments provides an image processing device comprising: a flash detection unit configured to detect whether or not each frame of image data includes a high luminance portion due to a flash; a holding unit configured to hold a past frame of the image data; and a correction processing unit configured to, if it is detected by the flash detection unit that frames include high luminance portions, correct the image data so as to consolidate a first image data and a second image data into one frame, the first image data being included in a first portion in a first frame stored in the holding unit, the second image data being included in a second portion in a second frame which is adjacent to the first frame, the first and second portions being high luminance portions.

A second aspect of the embodiments provides an image processing method, comprising: detecting whether or not each frame of image data includes a high luminance portion due to a flash; holding a past frame of the image data in a holding unit; and if it is detected that frames include high luminance portions, correcting the image data so as to consolidate a first image data and a second image data into one frame, the first image data being included in a first portion in a first frame stored in the holding unit, the second image data being included in a second portion in a second frame which is adjacent to the first frame, the first and second portions being high luminance portions.

BRIEF DESCRIPTION OF THE DRAWINGS

FIG. 15 is a flowchart showing an entire sequence of processing for taking and recording images in the image processing device of the fourth embodiment.

FIG. 16 is a flowchart showing an entire sequence of processing for taking and recording images in the image processing device of the fifth embodiment.

DETAILED DESCRIPTION

Figure 1:
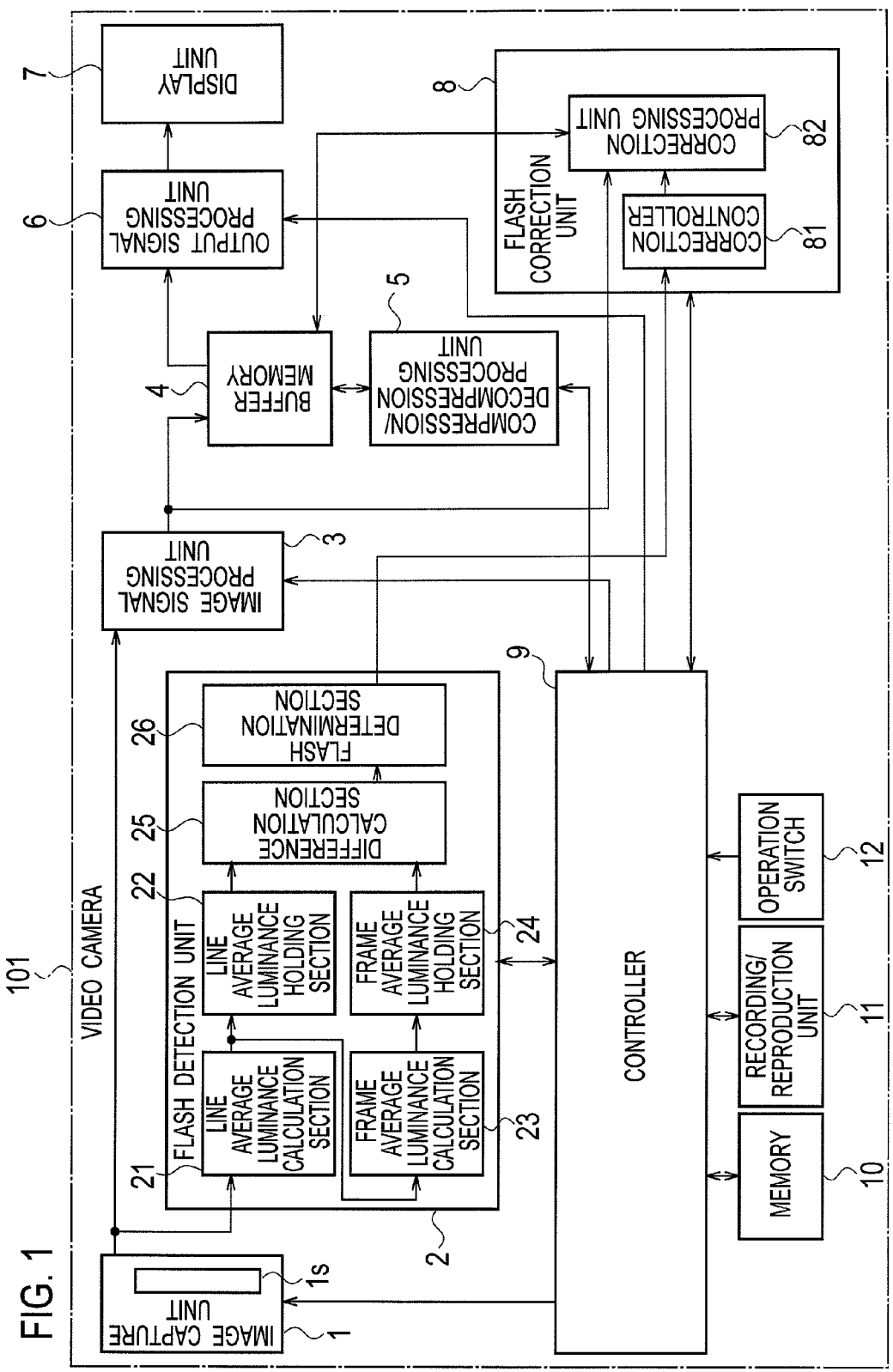
FIG. 1 is a block diagram illustrating an image processing device of the first embodiment.

Hereinafter, each embodiment of an image processing device and method will be explained with reference to the accompanying drawings. In each embodiment, as an example, the image processing device is applied to a video camera, and the image processing method is performed by the video camera.

First Embodiment

The entire configuration of a video camera 101 as an image processing device of the first embodiment will be explained by using FIG. 1. The video camera 101 includes an image capture unit 1, a flash detection unit 2, an image signal processing unit 3, a buffer memory 4, a compression/decompression processing unit 5, an output signal processing unit 6, a display unit 7, a flash correction unit (correction processing unit) 8, a controller 9, a memory 10, a recording/reproduction unit 11, and an operation switch 12.

The recording/reproduction unit 11 includes an arbitrary recording medium such as a semiconductor memory, a hard disk drive, and the like. The recording medium may be removable from the video camera 101.

The image capture unit 1 includes an optical system (not shown) including a lens, a diaphragm, and the like, CMOS sensors 1s, a control mechanism (not shown) for exposure, and the like.

As an example, the image capture unit 1 includes three CMOS sensors is and outputs electric signals representing R, G, and B signals as red, green, and blue color signals from the three CMOS sensors is. Certainly, the number of CMOS sensors may be one.

The image capture unit 1 extracts optical information inputted through a lens into the CMOS sensors is as electric signals and supplies the electric signals to the flash detection unit 2 and image signal processing unit 3.

The flash detection unit 2 includes a line average luminance calculation section 21, a line average luminance holding section 22, a frame average luminance calculation section 23, a frame average luminance holding section 24, a difference calculation section 25, and a flash determination section 26. The flash detection unit 2 detects a flash under the control of the controller 9 in the following manner.

The line average luminance calculation section 21 calculates the average brightness of each line based on the electric signal supplied from the image capture unit 1.

In the first embodiment, the electric signal used in the calculation is the G signal among the R, G, and B signals. Specifically, the line average luminance calculation section 21 adds up the values of the G signal of the effective pixels in a line and divides the obtained sum by the number of effective pixels in the line, to calculate the average brightness of the line (line average luminance).

The signal used to calculate the line average luminance is not limited to the G signal.

The line average luminance calculated by the line average luminance calculation section 21 is inputted to the line average luminance holding section 22 and the frame average luminance calculation section 23.

The line average luminance holding section 22 temporarily stores the line average luminance calculated by the line average luminance calculation section 21. The frame average luminance calculation section 23 calculates the average brightness over the whole frame.

Specifically, the frame average luminance calculation section 23 adds up the sequentially inputted line average luminances of the effective lines of one frame and divides the obtained sum by the number of effective lines in the frame to calculate the average brightness over the whole frame (entire frame average luminance). The frame average luminance holding section 24 temporarily holds the frame average luminance.

The difference calculation section 25 receives the line average luminances held by the line average luminance holding section 22 and the frame average luminance held by the frame average luminance holding section 24.

The frame which is subjected to the calculation of the frame average luminance and the frame which is subjected to the calculation of line average luminances are shifted from each other by one frame. The frame which is subjected to the calculation of the frame average luminance corresponds to a frame just before the frame which is subjected to the calculation of line average luminances.

The frame average luminance of the previous frame may be held for a period of one frame to be used as the frame average luminance of the frame two frames before the current frame. Moreover, it is possible to hold both the frame average luminance of the previous frame and the frame average luminance of the frame two frames before the current one and use the frame average luminance of the frame two frames before the current one when the previous frame is affected by a flash.

In the first embodiment, the line average luminances are calculated for the current frame, and the frame average luminance is calculated for the previous frame. That is, the current frame is a target frame which is subjected to detection of whether or not the frame includes some lines having high luminance due to a flash.

The difference calculation unit 25 sequentially calculates the difference between each line average luminance of the current frame and the frame average luminance of the previous frame. The difference calculation section 25 outputs the absolute value of the calculated difference as the difference value.

The difference value calculated by the difference calculation section 25 is inputted to the flash determination section 26. The flash determination section 26 determines whether or not the difference value of each line is equal to or greater than a threshold value. And, the flash determination section 26 determines whether or not the number of consecutive lines that have difference values equal to or greater than the threshold value is equal to or greater than a previously set number of lines.

The flash determination section 26 outputs a detection signal indicating that a flash has been detected and outputs data indicating the number of the first line of the consecutive lines that have difference values equal to or greater than the threshold value, which corresponds to the start time of the flash. The flash determination section 26 also outputs data indicating the number of the first line after the consecutive lines that have a difference value less than the threshold value. The line just before the first line that has a difference value less than the threshold value is the last line of the flash detected lines.

If it is determined that there is a flash, the flash determination section 26 generates "1" as the detection signal in order to indicate the flash determination. When no flash is detected the flash determination section 26 generates "0" as the detection signal.

As apparent from the above description, the flash detection unit 2 detects a flash only by calculating the line average luminance, the frame average luminance, and the difference values and then by judging the significance of calculated difference values. Accordingly, the flash detection unit 2 does not need to include a large-capacity memory resource such as a frame memory.

In the above description, the flash detection unit 2 detects light from a camera flash. However, the flash detection unit 2 also detects discontinuous image brightness in the case where strong light similar to that of a flash is incident on the CMOS sensors is for a short period. The detection of a flash herein includes such a case.

The flash detection unit 2 compares the line average luminance of each line of the current frame with the frame average luminance of a past frame (for example, the previous frame). Specifically, if the difference values of the lines having high luminance are equal to or greater than the threshold value, then these lines are determined to have high luminance due to a flash.

In contrast, if the line average luminances of adjacent lines in the current frame are compared, only the boundary line, between the normal lines and high luminance lines, has a difference value equal to or greater than the threshold value.

In the first embodiment, it is therefore possible to detect discontinuity of image brightness in a frame with fewer false positives.

The image signal processing unit 3 converts the electric signals supplied from the image capture unit 1 to signals of a predetermined signal system. In the first embodiment, as described above, the electric signals are R, G, and B signals. The image signal processing unit 3 therefore adjusts the white balance and gain and performs gamma processing and the like, followed by conversion to a luminance signal Y and color-difference signals Cb and Cr. The flash detection unit 2 may calculate the line average luminance and the frame average luminance based on the luminance signal Y.

The buffer memory (holding unit) 4 temporarily holds image data including the luminance signal Y and color-difference signals Cb and Cr outputted from the image signal processing unit 3. The memory and operation resources required for the image processing can be reduced if the color-difference signals Cb and Cr are band-limited and are subjected to time-division multiplexing.

If a flash is detected, the image data inputted from the image signal processing unit 3 and held in the buffer memory 4 is used in the image data correction process by the flash correction unit 8 described later.

The compression/decompression processing unit 5 compresses image data read from the buffer memory 4 by a compression method such as MPEG-2, MPEG-4, AVC/H.264, JPEG, or the like and generates encoded data. Moreover, the compression/decompression processing unit 5 decompresses the encoded data read from the recording/reproduction unit 11.

The output signal processing unit 6 outputs the image data read from the buffer memory 4 to an external device (not shown). Moreover, the output signal processing unit 6 converts the image data to a particular format (an NTSC signal, or example) depending on the required input format of the display unit 7 and changes the size of the image data depending on the display screen of the display unit 7, so that image data can be displayed on the display unit 7. The image data is then supplied to the display unit 7 and is displayed.

The output signal processing unit 6 also receives an on-screen signal outputted from the controller 9 and superimposes the on-screen signal on the image data.

The flash correction unit 8, as described later, does not systematically correct all image data to substantially the state in which there is no flash but corrects image data having discontinuous image brightness. Image data in which a flash has deliberately been used, is maintained.

When image data which is recorded in the recording/reproduction unit 11 has a portion with high luminance due to a flash, the flash correction unit 8 corrects the image data when it is reproduced.

The flash correction unit 8 supplies the corrected image data to the buffer memory 4.

The controller 9 can be composed of a microcomputer including a CPU. The controller 9 includes storage which stores a control program for controlling the entire video camera 101. The controller 9 controls the entire video camera 101 based on the control program. In order to implement the image processing of the first embodiment with an image processing program, the image processing program executing the image processing of the first embodiment may be provided as a part of the control program. In this case, the controller 9 executes the image processing program to perform flash detection and corrects image data when a flash is detected.

The controller 9 is connected to the memory 10 which functions as working memory for the controller 9. The controller 9 is further connected to the recording/reproduction unit 11 and the operation switch 12.

Upon being instructed by the operation switch 12 to record a moving image, the controller 9 controls the encoded data outputted from the compression/decompression processing unit 5 such that it is recorded in the recording/reproduction unit 11.

Upon being instructed by the operation switch 12 to reproduce the recorded moving image, the controller 9 instructs the recording/reproduction unit 11 to reproduce and read the encoded data and to supply the same to the compression/decompression processing unit 5. The controller 9 generates an on-screen signal by following the operation of the operation switch 12 and supplies the signal to the output signal processing unit 6.

The flash detection unit 2 is composed of hardware in the example shown in FIG. 1 but may be composed of software. That is, the configuration equivalent to the flash detection unit 2 may be implemented by executing a flash detection program as a part of the image processing program of the first embodiment. The flash correction unit 8 may also be composed of software. That is, the configuration equivalent to the flash correction unit 8 may be implemented by executing a flash correction program as a part of the image processing program of the first embodiment.

Herein, a description follows of the phenomenon of discontinuous image brightness in a moving image which is caused by an unexpected flash from a person other than the person who is taking the moving image.

The CMOS sensors 1s employing the rolling shutter method read pixel data of the captured image line Ln by line Ln. As shown in (b) of FIG. 2, in each of images ST1, ST2, ST3, ST4, . . . of a subject captured by the image capture unit 1, the first to the last lines Ln of each frame are temporally shifted. The imaging time of each line Ln includes exposure time and read time of pixel data as shown in (a) of FIG. 2.

Figure 2:
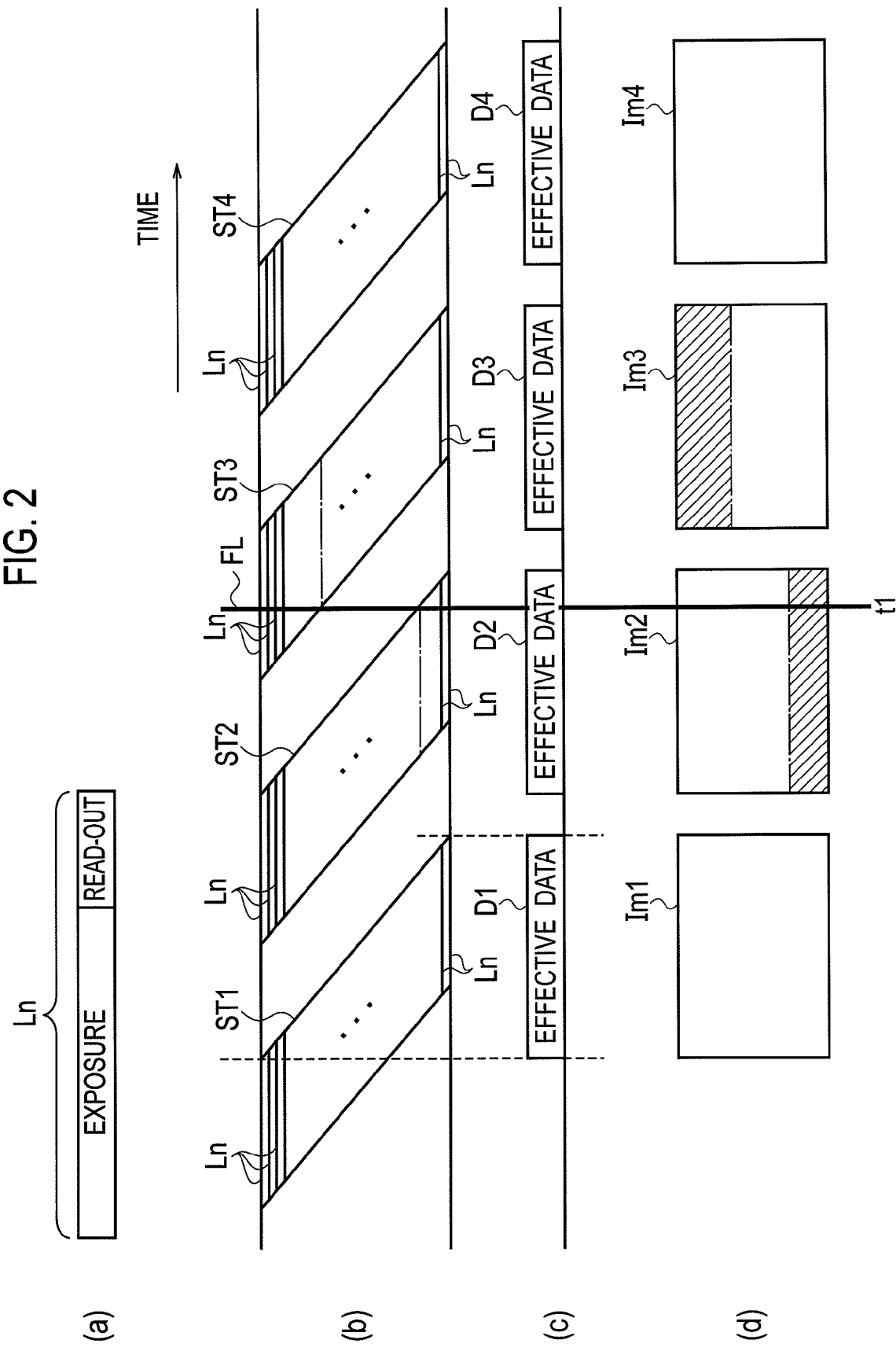
FIG. 2 is a view for explaining the phenomenon of discontinuity in image brightness that is caused by a flash in the process of taking a moving image with CMOS sensors.

As shown in (c) of FIG. 2, based on images ST1, ST2, ST3, ST4, . . . captured by the image capture unit 1, effective data sets D1, D2, D2, D4, . . . are outputted from the image capture unit 1. It is assumed that a flash FL, from a person other than the person who is taking the moving image, occurs at time t1 and is incident on the CMOS sensors 1s.

In this case, the flash FL affects lines Ln from the position indicated by the dashed-dotted line to the last line Ln in image ST2 and lines Ln from the first line Ln to the position indicated by the dashed-dotted line in image ST3.

If the image data correction of the first embodiment is not performed, images Im1, Im2, Im3, Im4 . . . recorded in the recording/reproduction unit 11, reproduced therefrom, and displayed on the display unit 7 are as shown in (d) of FIG. 2.

Images Im1 and Im4 are normal images which are not affected by the flash FL and have continuous image brightness. Image Im2 is an abnormal image which includes a bright white band in the lower half below the dashed-dotted line and has discontinuous image brightness. The hatched area indicates a high luminance portion. Image Im3 is an abnormal image which includes a similar bright white band in the upper half above the dashed-dotted line and has discontinuous image brightness.

The extent affected by the flash FL depends on the exposure time. The exposure time depends on shutter speed. When shutter speed is 1/60 second in NTSC signal format, the high luminance portions, which are the hatched areas in images Im2 and Im3 shown in (d) of FIG. 2, become substantially one frame period. When shutter speed is 1/50 second in PAL signal format, the high luminance portions in images Im2 and Im3 shown in (d) of FIG. 2, become substantially one frame period.

In the case of using the flash of the video camera 101 which is taking the moving image, the flash timing is matched to the image capture timing as shown in (b) of FIG. 2. Accordingly, the above-described phenomenon of discontinuous image brightness as shown in (d) of FIG. 2 does not occur.

Figure 3:
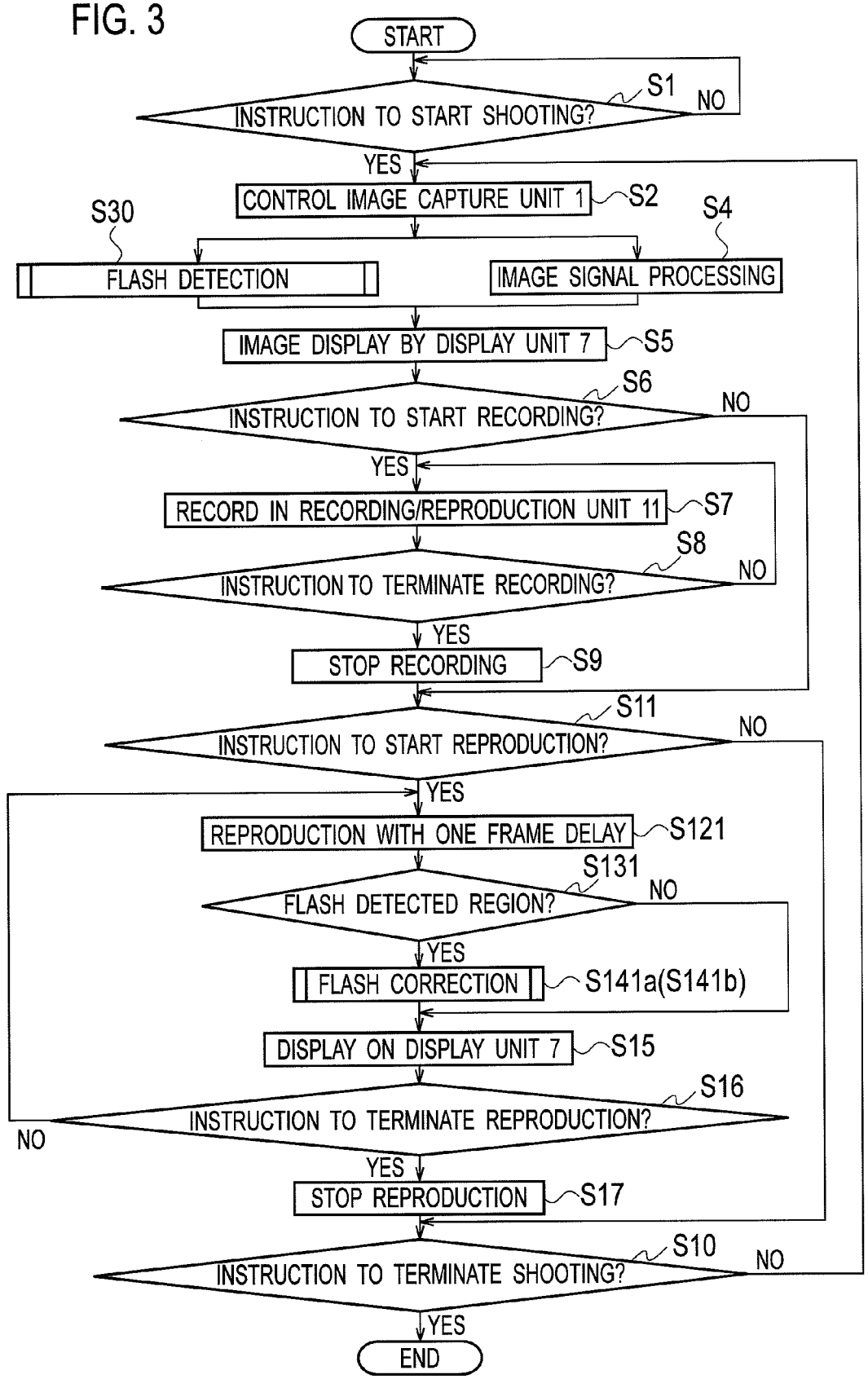
FIG. 3 is a flowchart showing an entire sequence of processing for taking and recording images in the image processing device of the first embodiment.

The operation of the video camera 101 according to the first embodiment is described in more detail with reference to FIGS. 3 to 8. FIG. 3 shows the entire sequence of the image taking and recording process by the video camera 101.

In FIG. 3, the controller 9 determines in step S1 whether or not there is an instruction by the operation switch 12 to start shooting.

If it is determined that there is an instruction to start shooting (YES), the process proceeds to step S2 and the controller 9 instructs the image capture unit 1 to start image capture in accordance with the set conditions including the diaphragm setting and shutter speed. The instruction to start shooting may be an instruction by the operation switch 12 to turn on the video camera 101.

If it is not determined that there is an instruction to start image capture (NO), the controller 9 returns the process to step S1 and repeats step S1.

In step S30, the controller 9 instructs the flash detection unit 2 to execute the flash detection process. The controller 9 instructs the image signal processing unit 3 to execute the image signal processing in step S4 in parallel with step S30. The flash detection processes of step S30 are described in detail later. In step S5, the controller 9 instructs the output signal processing unit 6 to display the captured image on the display unit 7.

In step S6, the controller 9 determines whether or not there is an instruction by the operation switch 12 to start recording. If it is determined that there is an instruction to start recording (YES), the controller 9 instructs the recording/reproduction unit 11 to record the encoded data outputted from the compression/decompression processing unit 5 in step S7.

If it is not determined that there is an instruction to start recording (NO), the controller 9 moves the process to step S11.

In step S8, the controller 9 determines whether or not there is an instruction to terminate recording. If it is determined that there is an instruction to terminate recording (YES), the process moves to step S9 where, the controller 9 stops recording in the recording/reproduction unit 11.

If it is not determined that there is an instruction to terminate recording (NO), the controller 9 returns the process to step S7 and repeats step S7.

Following step S9, the controller 9, in step S11, determines whether or not there is an instruction by the operation switch 12 to start reproducing a predetermined image data recorded in the recording/reproduction unit 11.

If it is determined that there is an instruction to start reproduction (YES), the controller 9 instructs the recording/reproduction unit 11 to reproduce the image data (encoded data) recorded therein in step S121. At this time, the controller 9 instructs the recording/reproduction unit 11 to reproduce the image data, in a state that the image data read from the recording/reproduction unit 11 is delayed by one frame using a frame memory (not shown).

The compression/decompression processing unit 5 decompresses the encoded data read out from the recording/reproduction unit 11, and the decompressed data is inputted and stored in the buffer memory 4. If it is not determined that there is an instruction to start reproduction (NO) in step S11, the controller 9 moves the process to step S10.

In step S131, the controller 9 determines whether or not there is a flash detected region. A flash detected region is a region where high luminance due to a flash is detected in the image data to be reproduced. As described later, a flash detected region in the image data can be distinguished by referring to metadata (added information) added to the encoded data.

If it is determined that there is a flash detected region (YES), the controller 9 instructs the flash correction unit 8 to execute the flash correction process in step S141a (or S141b). The flash correction process in step S141a (or S141b) is, as described above, a process for correcting image data having discontinuous image brightness while maintaining the state in which a flash has deliberately been used.

In step S15, the controller 9 instructs the image data corrected in step S141a (or S141b) to be displayed on the display unit 7.

In this case, the decompressed image data that is stored in the buffer memory 4 is inputted to the flash correction unit 8, and the flash correction process is executed by step S141a (S141b). The corrected image data is inputted to and stored in the buffer memory 4 and supplied to the display unit 7 through the output signal processing unit 6.

If it is not determined that there is a flash detected region (NO) in step S131, the controller 9 moves the process to step S15. In step S15, the controller 9 instructs the image data reproduced in step S12 to be displayed on the display unit 7 without modification. In this case, the decompressed image data that is stored in the buffer memory 4 is outputted to the output signal processing unit 6 without modification and supplied to the display unit 7.

In step S16, the controller 9 determines whether or not there is an instruction to terminate reproduction. If it is determined that there is an instruction to terminate reproduction (YES), the controller 9 stops reproducing the image data in step S17 and returns the process to step S12 and repeats step S12 and the subsequent steps.

In step S10, the controller 9 determines whether or not there is an instruction by the operation switch 12 to terminate shooting. If it is determined that there is an instruction to terminate shooting (YES), the controller 9 terminates the process. If it is not determined that there is an instruction to terminate shooting (NO), the controller 9 returns the process to step S2 and repeats step S2 and the subsequent steps. The instruction to terminate image capture may be an instruction by the operation switch 12 to turn off the video camera 101.

The flash detection processes of step S30 shown in FIG. 3 is described in detail with reference to FIG. 4. Step S30 in the first embodiment is referred to as step $S30_1$. The following steps are executed by the flash detection unit 2 based on control by the controller 9.

Figure 4:
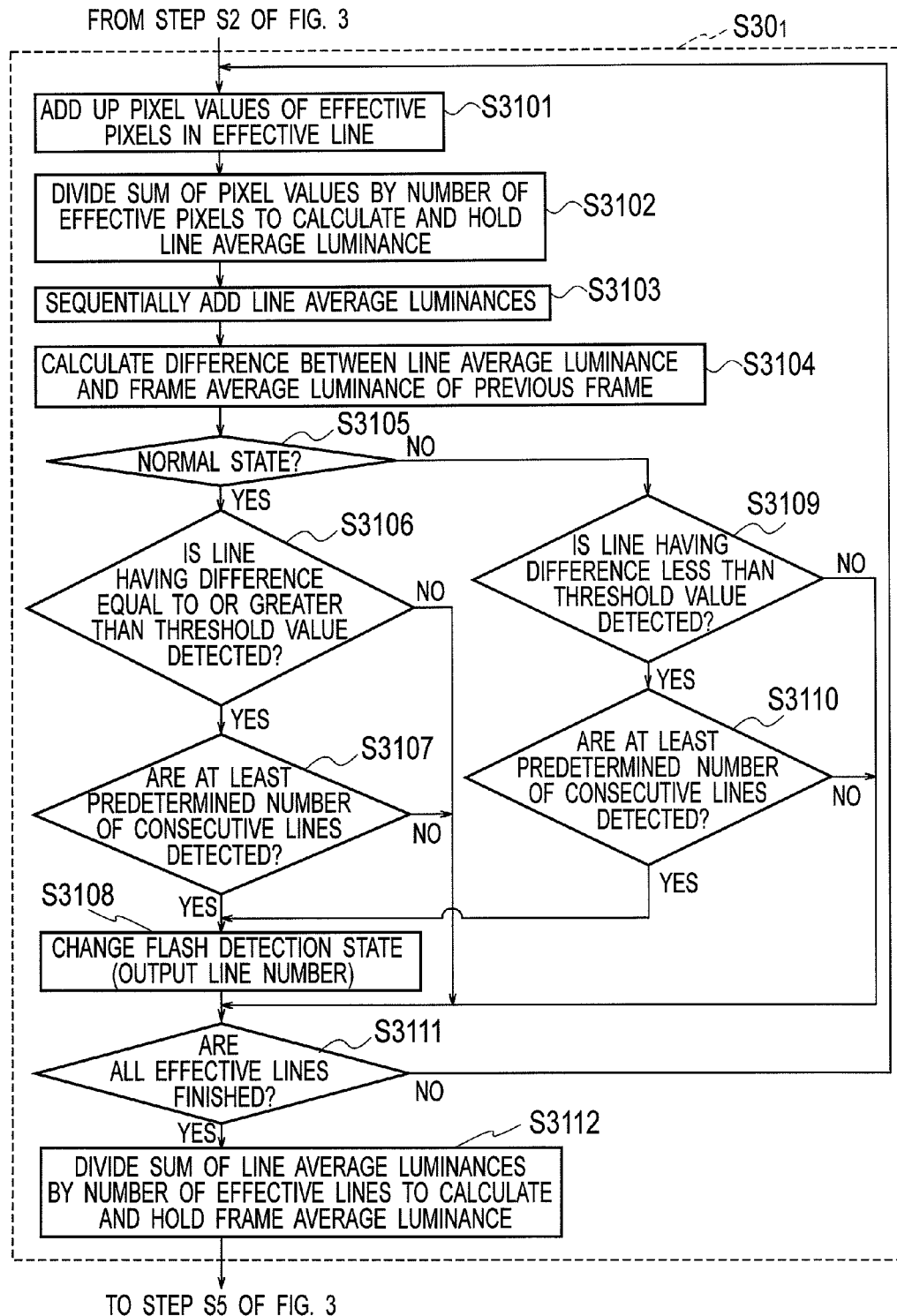
FIG. 4 is a flowchart showing details of flash detection processing in the first embodiment.

In FIG. 4, in step S3101, the flash detection unit 2 sequentially executes, effective line by effective line, a process of adding up pixel values of effective pixels in each effective line. In step S3102, the flash detection unit 2 divides the sum of the pixel values obtained in step S3101 by the number of effective pixels in the line to calculate the line average luminance. The flash detection unit 2 also holds the calculated line average luminances.

In step S3103, the flash detection unit 2 executes a process of sequentially adding up the line average luminances. In step S3104, the flash detection unit 2 executes a process of calculating the difference value between each line average luminance calculated in step S3102 and the frame average luminance of the previous frame. The difference calculation process in step S3104 is executed each time that the line average luminance is calculated in step S3102.

In step S3105, the flash detection unit 2 determines whether or not the current state is a normal state in which a flash has not been detected. If it is determined that it is a normal state (YES), the flash detection unit 2 determines whether or not a line having a difference value equal to or greater than the threshold value is detected.

If it is determined that a line having a difference value equal to or greater than the threshold value is detected (YES), the flash detection unit 2 moves the process to step S3107 At this time, the flash detection unit 2 stores detected line information indicating how many lines there are from the first line of the frame to the detected line.

On the other hand, if it is not determined that a line having a difference value equal to or greater than the threshold value is detected (NO), the flash detection unit 2 deletes the already stored detected line information and moves the process to step S3111.

In step S3107, the flash detection unit 2 determines whether or not at least a predetermined number of consecutive lines have difference values equal to or greater than the threshold value.

If it is determined that the predetermined number of consecutive lines have difference values equal to or greater than the threshold value (YES), the flash detection unit 2 moves the process to step S3108.

If it is not determined that the predetermined number of consecutive lines have difference values equal to or greater than the threshold value (NO), the flash detection unit 2 moves the process to step S3111.

The case in which it is determined that the current state is a normal state in step S3105, a line having a difference value equal to or greater than the threshold value is detected in step S3106, and the predetermined number of consecutive lines with difference values equal to or greater than the threshold value is detected in step S3107 means that, it is detected that the state has changed from the state in which the image is not affected by a flash, to the state in which the image is affected by a flash and has high luminance.

In step S3108, the flash detection unit 2 changes the flash detection state from the state in which a flash is not detected to the state in which a flash is detected. In the first embodiment, the flash detection unit 2 supplies detected line information indicating the start line of a detected flash to the controller 9, and deletes the stored detected line information.

On the other hand, if it is not determined that the current state is a normal state in step S3105, then in step S3109 the flash detection unit 2 determines whether or not a line which has a difference value less than the threshold value is detected.

If it is determined that a line which has a difference value less than the threshold value is detected (YES), the flash detection unit 2 moves the process to step S3110. At this time, the flash detection unit 2 stores the detected line information indicating how many lines there are from the first line of the frame to the detected line.

In step S3110, the flash detection unit 2 determines whether or not the number of consecutive lines that have difference values less than the threshold value is equal to or greater than a previously set number of lines.

If it is determined that the number of consecutive lines that have difference values less than the threshold value is equal to or greater than the previously set number of lines (YES), the flash detection unit 2 moves the process to step S3108.

If it is not determined that the number of consecutive lines that have difference values less than the threshold value is equal to or greater than the previously set number of lines (NO), the flash detection unit 2 moves the process to step S3111.

The case in which it is determined that the current state is not a normal state in step S3105, a line having a difference value less than the threshold value is detected in step S3109, and the predetermined number of consecutive lines with difference values less than the threshold value is detected in step S3110 means that, it is detected that the state has changed from the state in which the image is affected by a flash and has high luminance, to the state in which the image is not affected by a flash.

In step S3108, the flash detection unit 2 changes the flash detection state from the state in which a flash is detected to the state in which a flash is not detected. In the first embodiment, the flash detection unit 2 supplies detected line information indicating the final line of a detected flash to the controller 9, and deletes the stored detected line information.

In step S3111, the flash detection unit 2 determines whether or not the determination of all the effective lines has finished. If it is not determined that the determination of all the effective lines has finished (NO), the flash detection unit 2 returns the process to step S3101 and repeats step S3101 and the subsequent steps.

If it is determined that the determination of all the effective lines has finished (YES), in step S3112, the flash detection unit 2 divides the sum of the line average luminances by the number of effective lines to calculate the frame average luminance and holds the calculated frame average luminance.

In step S7, in FIG. 3, the controller 9 ensures that the detected line information, indicating the start line and the final line of a detected flash, is recorded as metadata which is added to the encoded data outputted from the compression/decompression processing unit 5 at the point when the encoded data is recorded in the recording/reproduction unit 11.

The flash correction process of step S141a shown in FIG. 3 is described in detail with reference to FIGS. 5 and 6. FIG. 6 shows a correction operation in step S141a that is a first example of the flash correction process of the first embodiment. In FIG. 6, the hatched area indicates a high luminance portion due to a flash. This is the same as in FIGS. 8 and 11.

Each of the following steps are executed by the flash correction unit 8 on the basis of the control of the controller 9. The controller 9 instructs the flash correction unit 8 to execute a flash correction process on the basis of the metadata added to the encoded data.

In FIG. 6, (a) represents images Im1, Im2, Im3, Im4 . . . before correction, which are image data read from the recording/reproduction unit 11. In step S121 in FIG. 3, because the image data is reproduced with a one frame delay, image Im0, which is one frame before the current frame, is reproduced at the timing of frame Im1, and image Im1 is reproduced at the timing of frame Im2, as shown in (b) of FIG. 6.

In the flash detection process of step $S30_1$ described in FIG. 4, a flash start line Lnfs, which is the start line of the flash, is detected in image Im2. The high luminance portion due to a flash is from the flash start line Lnfs to the lower end of image Im2, and from the top of image Im3 to the flash end line Lnfe.

In the embodiment, the signal format of the image data is NTSC signal format, and the shutter speed is 1/60 second. Therefore, the high luminance portion due to a flash, which is formed from the lines in the portion from the flash start line Lnfs to the lower end of image Im2 and the lines in the portion from the top of image Im3 to the flash end line Lnfe, is substantially one frame period.

The upper portion of image Im2 before the flash start line Lnfs is a portion Ar21, and the subsequent lines from the flash start line Lnfs is a portion Ar22. The upper portion of image Im3 before the flash end line Lnfe is a portion Ar31, and the subsequent lines after the flash end line Lnfe is a portion Ar32 in image Im3.

Figure 5:
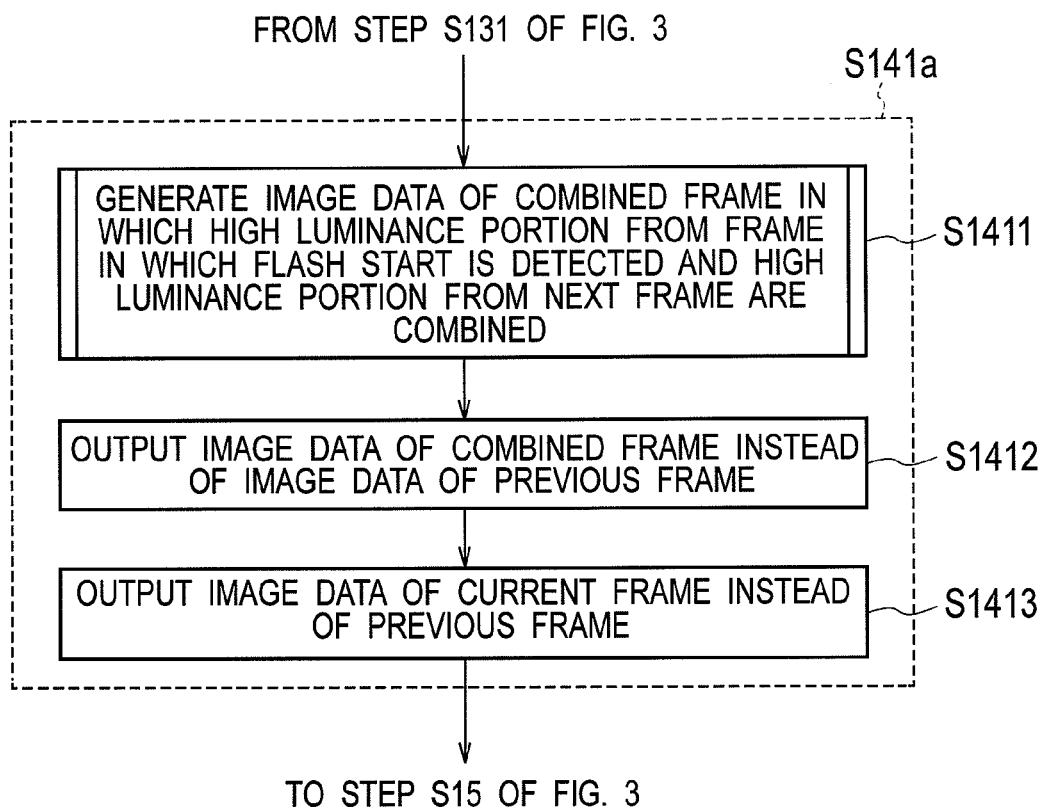
FIG. 5 is a flowchart showing a first example of flash correction processing in the first embodiment.
Figure 6:
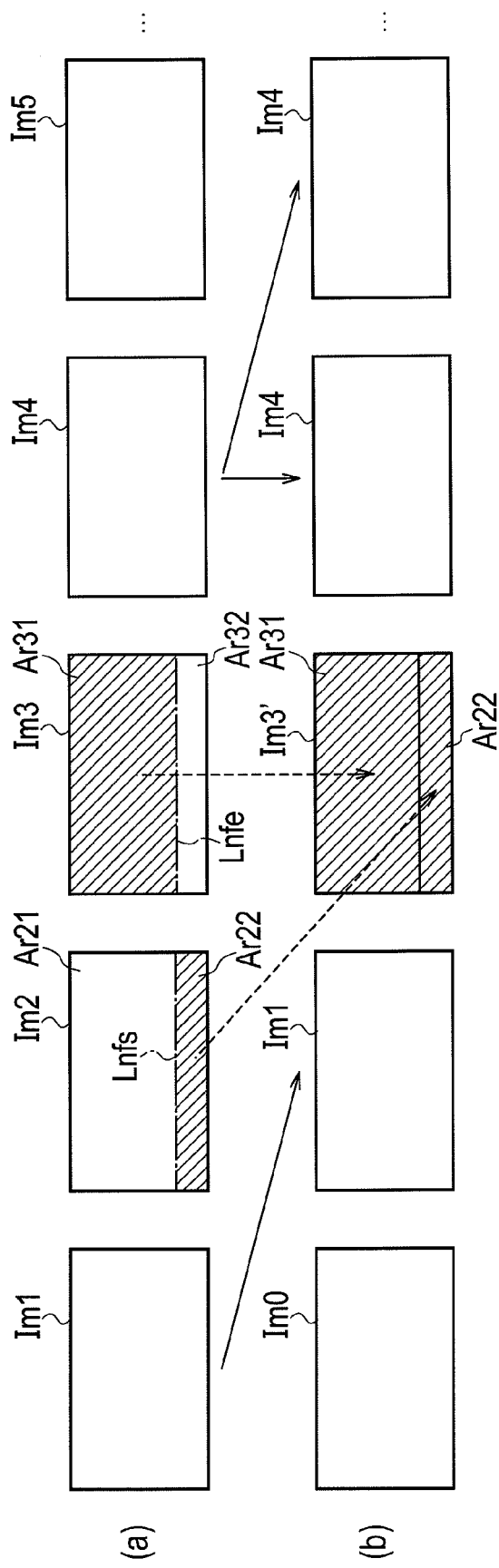
FIG. 6 is a view for explaining the first example of the flash correction processing in the first embodiment.

As shown in FIG. 5, step S141a includes steps S1411-S1413. In step S1411, the flash correction unit 8 generates image data of a combined frame in which the high luminance portion of the frame in which a flash start is detected and the high luminance portion in the next frame are combined. In the example shown in FIG. 6, the flash correction unit 8 generates image data of a combined frame in which the image data of portion Ar22 and the image data of portion Ar31 are combined.

In step S1412, the flash correction unit 8 does not reproduce image Im2 at the timing of image Im3 in (a) of FIG. 6, but instead reproduces the image data of image Im3' which is a combined frame in which the image data of portion Ar22 and the image data of portion Ar31 are combined.

At the next timing of the image Im4 in (a) of FIG. 6, in step S1413, the flash correction unit 8 does not reproduce image Im3, which is one frame before the current frame, but instead reproduces image Im4 which is the current undelayed frame.

After the above-mentioned step S141a which includes steps S1411-S1413, the process returns to step S121 through steps S15 and S16. Therefore, from the timing of image Im5 in (a) of FIG. 6, the subsequent images from image Im4, which is one frame before the current frame, are reproduced.

In the first example of the flash correction process shown in FIG. 6, the high luminance portions due to a flash are consolidated into one frame, image Im3'. Because image Im3' does not have discontinuous image brightness, the feeling of strangeness is reduced. Furthermore, in the first example, because image Im3' keeps the state in which a flash has deliberately been used, such a circumstance is not spoiled.

When the shutter speed is 1/60 second, it is already known that combining the image data of portion Ar22 in image Im2 and the image data of portion Ar31 in image Im3, which is adjacent to image Im2, each image data being stored in the buffer memory 4, makes substantially one frame period. Therefore, when a flash is detected by the flash detection unit 2, the controller 9 corrects the image data so as to consolidate the divided high luminance portions in images Im2 and Im3 into one frame.

When the light-emitting time of a flash is long, combining the image data of portion Ar22 in image Im2 and the image data of portion Ar31 in image Im3 will make a period (the whole vertical effective period) longer than one frame period.

In this case, the high luminance portions may be consolidated though a little surplus will occur.

When a high luminance portion is divided into two frames, the prior frame is the first frame with a latter portion being partially high luminance, and the later frame is the second frame with a first portion being partially high luminance.

It is preferable that the image data is corrected, by consolidating the image data of the first and second portions into one frame, when the first and second portions combine to make an entire portion equal to or greater than one frame.

When the shutter speed is shorter than 1/60 second, combining the image data of portion Ar22 in image Im2 and the image data of portion Ar31 in image Im3 does not make the entire period (the entire vertical effective period) of one frame but makes a period shorter than one frame period. In this case, there is no need to correct the image data by consolidating the high luminance portions.

The flash correction unit 8 may correct the image data, by consolidating the high luminance portions, when the shutter speed is within a predetermined range. The predetermined range of the shutter speed may be one specific shutter speed, e.g. 1/60 second when the frame frequency is 60 Hz, and 1/50 second when the frame frequency is 50 Hz.

Figure 7:
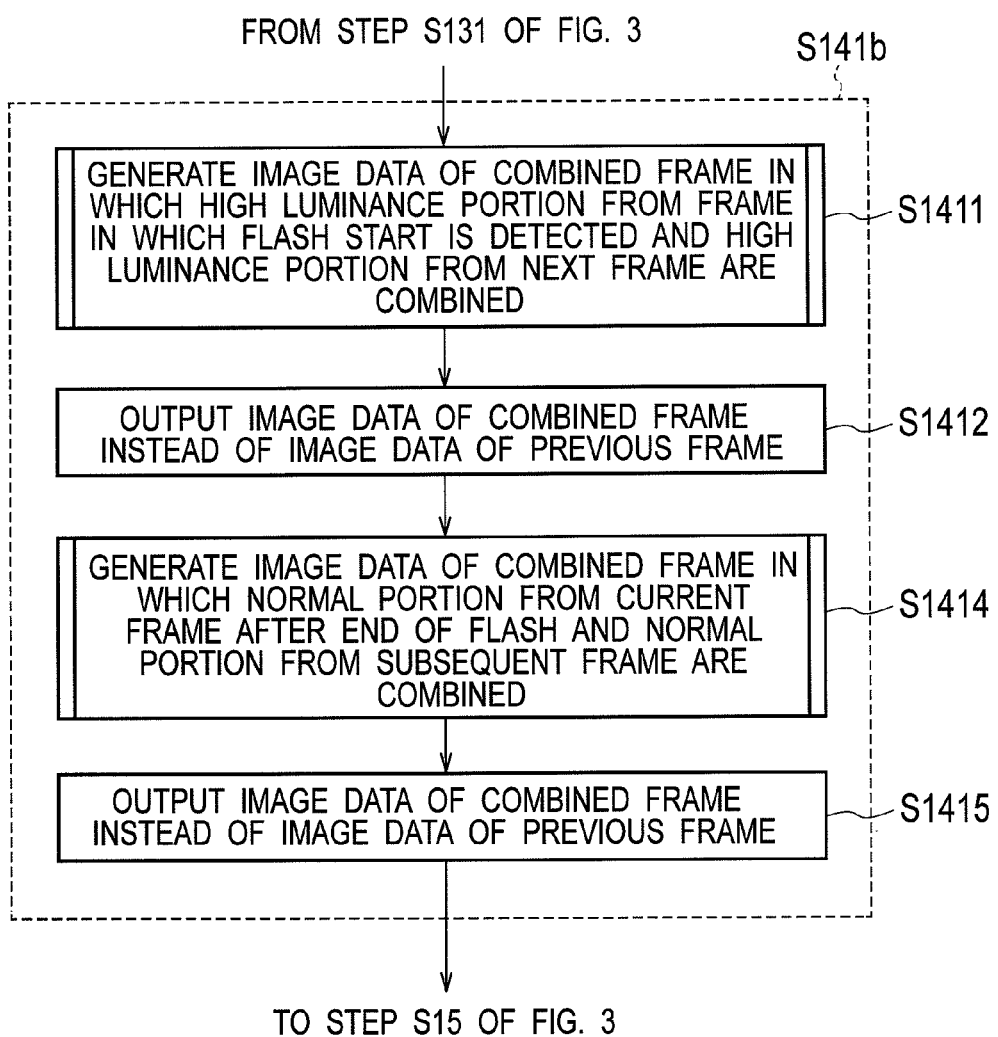
FIG. 7 is a flowchart showing a second example of the flash correction processing in the first embodiment.
Figure 8:
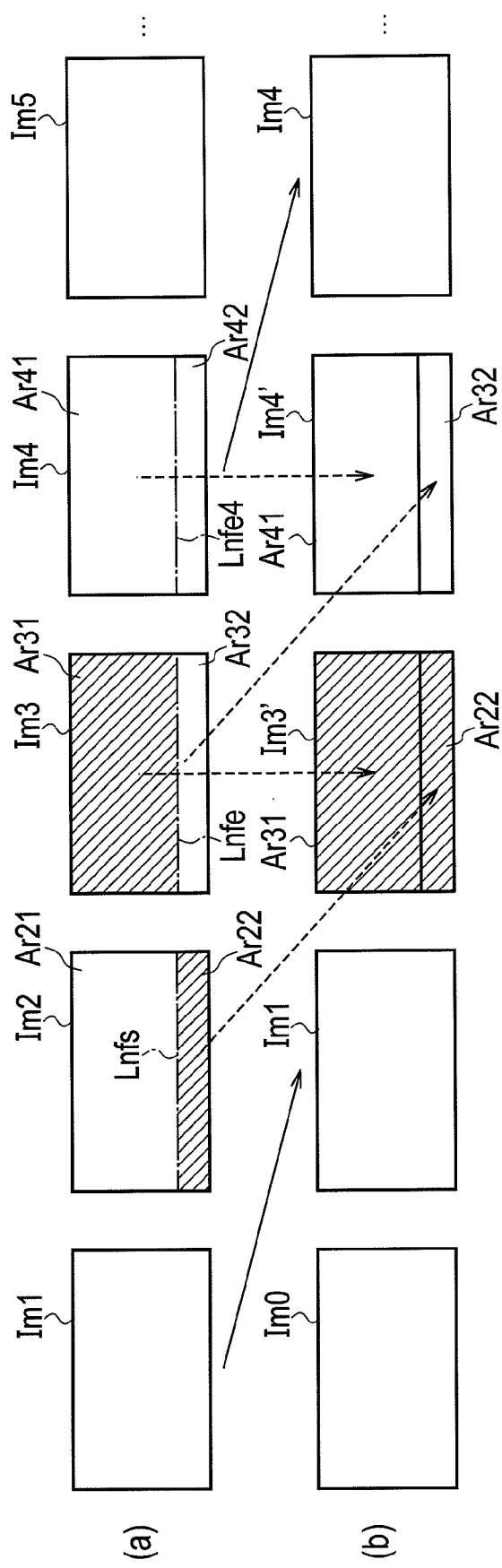
FIG. 8 is a view for explaining the second example of the flash correction processing in the first embodiment.

FIGS. 7 and 8 explain the detail of the flash correction process of step S141b in FIG. 3. FIG. 8 shows a correction operation in step S141b that is a second example of the flash correction process of the first embodiment.

As shown in FIG. 7, step S141b includes steps S1411, S1412, S1414, and S1415. Steps S1411 and S1412 in step S141b are identical to those of step S141a. Therefore, as for FIG. 6, in step S1412, the flash correction unit 8 does not reproduce image Im2 at the timing of image Im3 in (a) of FIG. 8, but reproduces the image data of image Im3' which is a combined frame in which the image data of portion Ar22 and the image data of portion Ar31 are combined.

In image Im4, the upper portion equal to or before line Lnfe4, which is the same line as the flash end line Lnfe in the image Im3, is a portion Ar41, and the portion subsequent to line Lnfe4 is a portion Ar42.

As shown in FIG. 7, in step S1414, the flash correction unit 8 generates image data of a combined frame in which the normal portion in the current frame after finishing the flash and the normal portion in the subsequent frame are combined. In the example shown in FIG. 8, the flash correction unit 8 generates image data of a combined frame in which the image data of portion Ar41 and the image data of portion Ar32 are combined.

In step S1415, the flash correction unit 8 does not reproduce image Im3 at the timing of image Im4 in (a) of FIG. 8 but instead reproduces the image data of image Im4', which is a combined frame generated in step S1414.

After the above-mentioned step S141b which includes steps S1411, S1412, S1414 and S1415, the process returns to step S121 through steps S15 and S16. Therefore, from the timing of image Im5 in (a) of FIG. 8, the subsequent images from image Im4, which is one frame before the current frame, are reproduced.

In the second example of the flash correction process shown in FIG. 8, the feeling of strangeness due to a flash is reduced, without spoiling an image which has been taken under the circumstance where a flash has deliberately been used.

In the first example, repeating the same image Im4 twice may cause a little feeling of strangeness depending on the movement of the image. On the other hand, in the second example, the image Im4' is reproduced instead of the image Im4, and the same image does not repeat. Therefore, the second example causes a lesser feeling of strangeness due to movement of the image than the first example.

Second Embodiment

Figure 9:
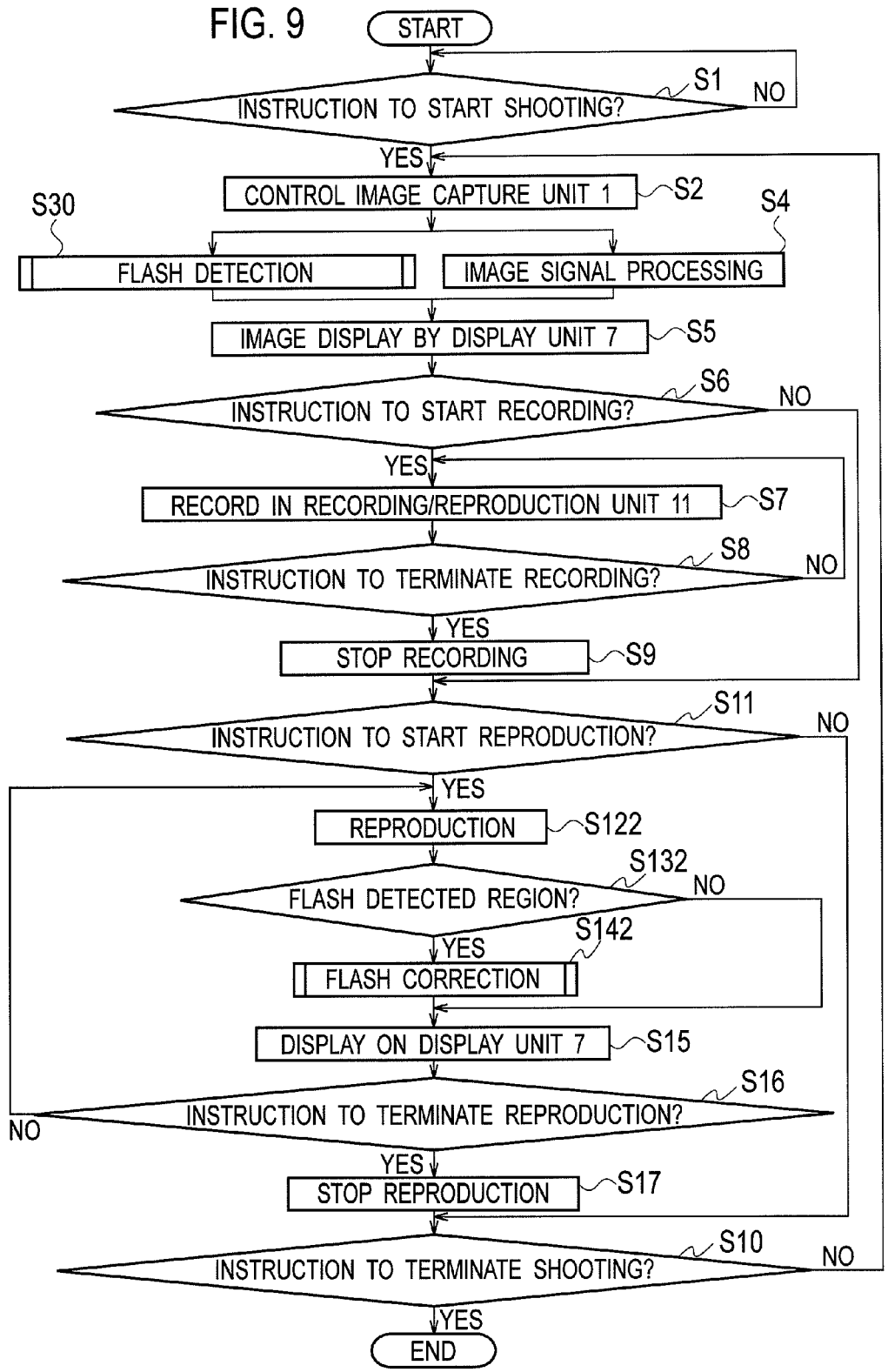
FIG. 9 is a flowchart showing an entire sequence of processing for taking and recording images in the image processing device of the second embodiment.

The configuration of the second embodiment of the image processing device is identical to the video camera 101 of the first embodiment shown in FIG. 1. FIG. 9 explains the operation of the second embodiment. In FIG. 9, the same steps as those of FIG. 3 are given the same reference numerals, and the description thereof is omitted.

In step S11, in FIG. 9, if it is determined that there is an instruction to start reproduction (YES), the controller 9 instructs the recording/reproduction unit 11 to reproduce the image data recorded therein in step S122. In this case, the controller 9 instructs the recording/reproduction unit to reproduce the image data read from the recording/reproduction unit 11 without a one frame delay.

In step S132, the controller 9 determines whether or not there is a flash detected region. If it is determined that there is a flash detected region (YES), the controller 9 instructs the flash correction unit 8 to execute the flash correction process in step S142.

The flash correction process in step S142 is, as for the first embodiment, a process for correcting image data having discontinuous image brightness while maintaining the state in which a flash has deliberately been used.

In step S15, the controller 9 instructs that the corrected image data in step S142 is displayed on the display unit 7.

The flash correction process in step S142 shown in FIG. 9 is explained in detail with reference to FIGS. 10 and 11. In FIG. 11, (a) represents images Im1, Im2, Im3, Im4 . . . before correction, which are image data read from the recording/reproduction unit 11.

In the second embodiment, because the image data is reproduced without a one frame delay in step S122, the image data of the images Im1, Im2, Im3, Im4 . . . is reproduced without a one frame delay, as shown in (b) of FIG. 11. Strictly, the image data is reproduced with a delay of a plurality of lines which is the time needed for the process in the buffer memory 4 and the compression/decompression processing unit 5 etc.

In image Im1 in (a) of FIG. 11, the upper portion before line Lnfs1 (which is the same line as the flash start line Lnfs in image Im2) is a portion Ar11, and the subsequent lines from line Lnfs1 (including line Lnfs1) is a portion Ar12.

Figure 10:
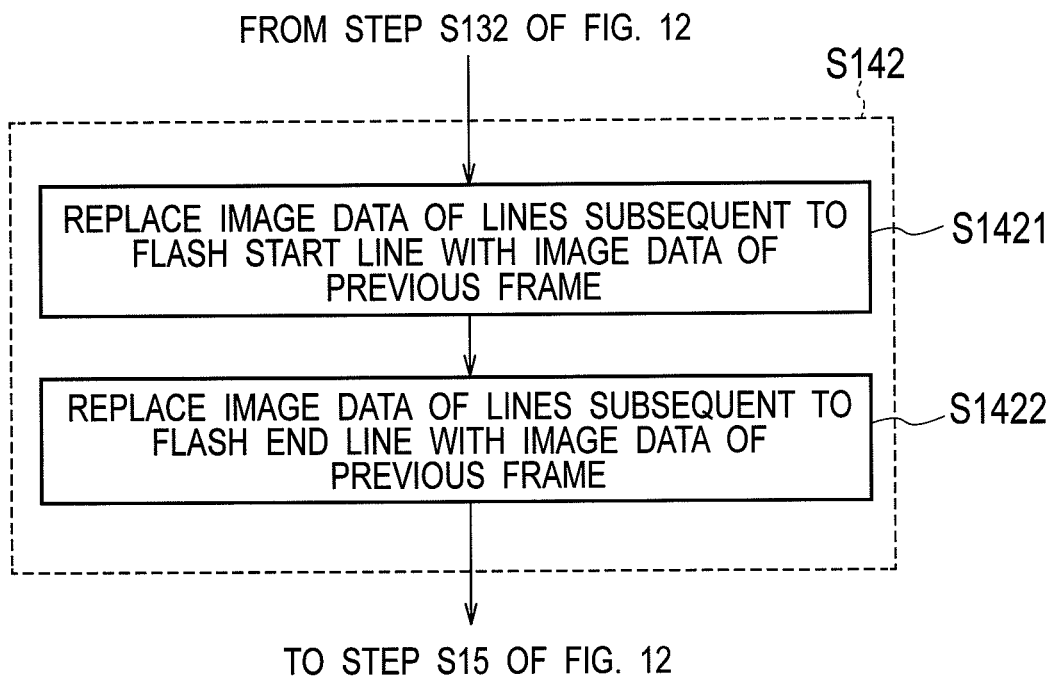
FIG. 10 is a flowchart showing flash correction processing in the second embodiment.
Figure 11:
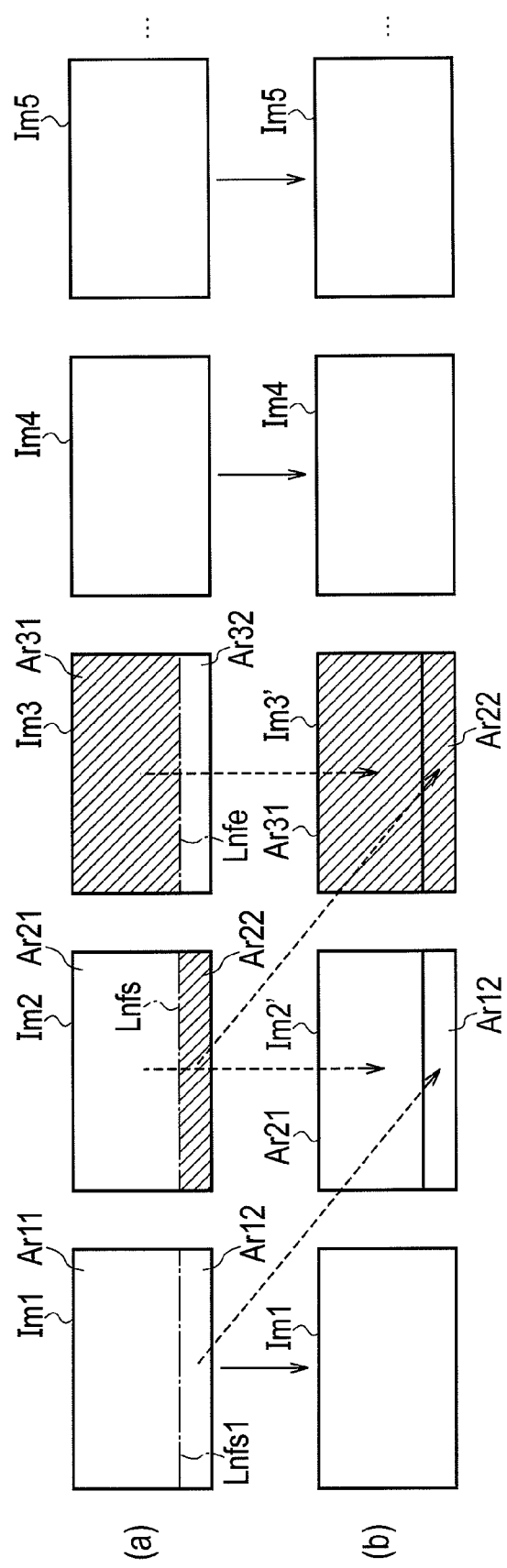
FIG. 11 is a view for explaining the flash correction processing in the second embodiment.

As shown in FIG. 10, step S142 includes steps S1421 and S1422. In step S1421, the flash correction unit 8 replaces the image data of the subsequent lines from the flash start line with the image data of the previous frame.

In the example shown in FIG. 11, the flash correction unit 8 generates image data of a combined frame in which the image data of portion Ar21 and the image data of portion Ar12 are combined, by replacing the lines of the high luminance portion Ar22 in image Im2 with the lines of portion Ar12 in image Im1.

In step S1422, the flash correction unit 8 replaces the image data of the subsequent lines from the flash end line with the image data of the previous frame.

In the example shown in FIG. 11, the flash correction unit 8 generates image data of a combined frame in which the image data of portion Ar31 and the image data of portion Ar22 are combined, by replacing the lines of portion Ar31 in image Im3 with the lines of portion Ar22 in image Im2.

From the timing of image Im4 in (a) of FIG. 10, subsequent images, including image Im4, are reproduced without delay.

In the second embodiment, the feeling of strangeness due to a flash is reduced, without spoiling an image which has been taken under the circumstance where a flash has deliberately been used.

Third Embodiment

Figure 12:
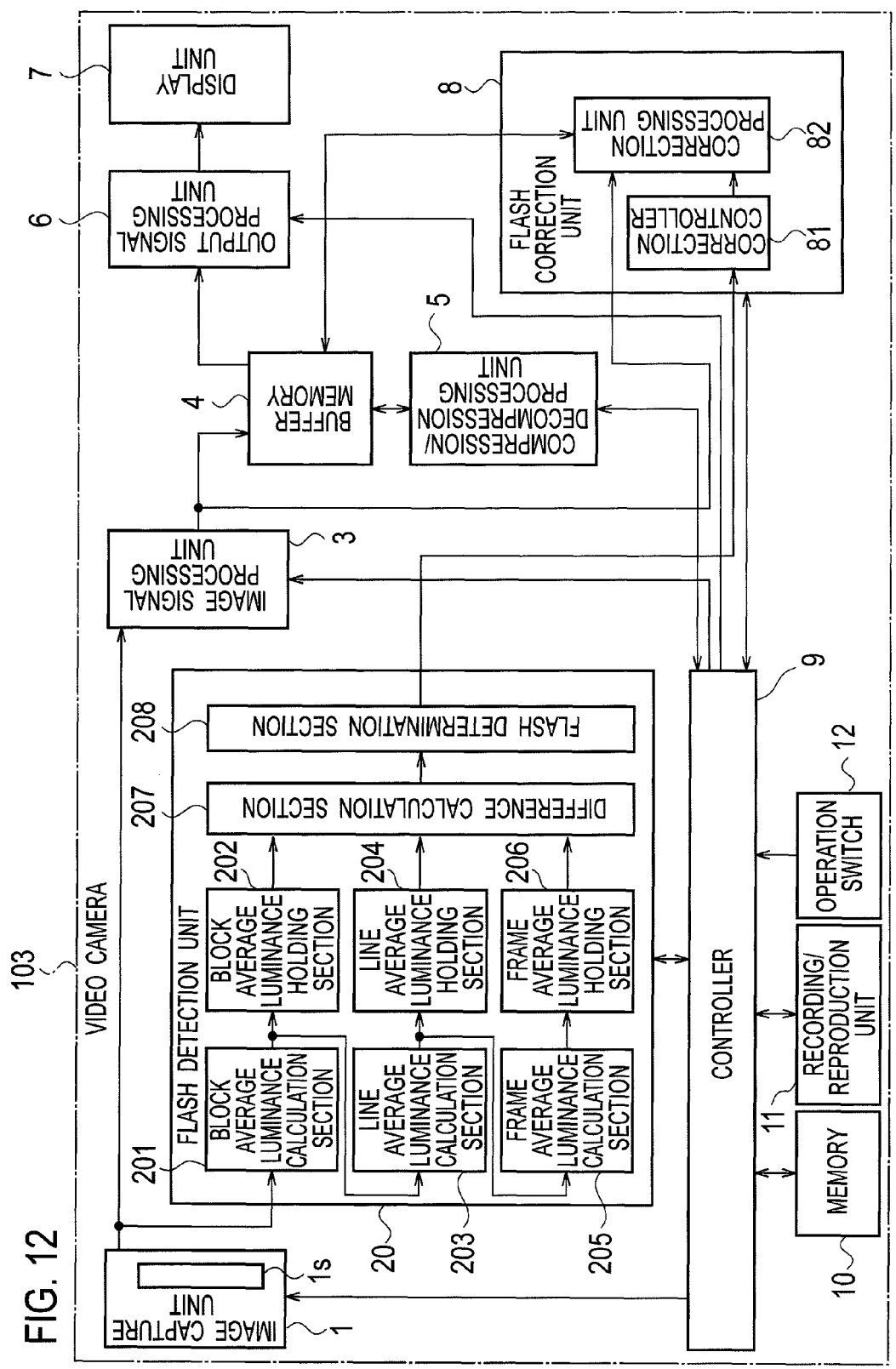
FIG. 12 is a block diagram illustrating an image processing device of the third embodiment.

In the third embodiment shown in FIG. 12, the same portions as those of FIG. 1 are given the same reference numerals, and the description thereof is omitted. The video camera 103 that is the third embodiment of the image processing device includes a flash detection unit 20 instead of the flash detection unit 2.

The third embodiment is configured to improve the accuracy of flash detection compared to the first and second embodiments, by including the flash detection unit 20 instead of the flash detection unit 2.

The flash correction process by the flash correction unit 8 is illustrated by the first example of the first embodiment described by FIG. 6, the second example of the first embodiment described by FIG. 8, and the second embodiment described by FIG. 11. Therefore, the configuration and operations of the flash detection unit 20 have already been mainly explained.

The flash detection unit 20 includes a block average luminance calculation section 201, a block average luminance holding section 202, a line average luminance calculation section 203, a line average luminance holding section 204, a frame average luminance calculation section 205, a frame average luminance holding section 206, a difference calculation section 207, and a flash determination section 208.

The flash detection unit 20 detects a flash in the following manner under the control of the controller 9. The block average luminance calculation section 201 divides the effective pixels of each line, in the electric signal supplied from the image capture unit 1, into a plurality of blocks and calculates the average brightness of each block. Preferably, the number of blocks is a power of 2.

Specifically, the block average luminance calculation section 201 adds up the values of the G signal of the effective pixels in each block and divides the same by the number of effective pixels in the block to calculate the average brightness of the block (block average luminance).

The block average luminances calculated by the block average luminance calculation unit 201 are inputted to the average luminance holding section 202 and line average luminance calculation section 203. The line average luminance calculation section 203 adds up the block average luminances of each line and divides the same by the number of blocks in the line to calculate the average brightness of the line (line average luminance).

The line average luminances calculated by the line average luminance calculation unit 203 are inputted to the line average luminance holding section 204 and the frame average luminance calculation section 205. The line average luminance holding section 204 temporarily holds the line average luminances calculated by the line average luminance calculation section 203.

The frame average luminance calculation section 205 adds up the sequentially inputted line average luminances of the effective lines in each frame and divides the same by the number of effective lines in the frame to calculate the average brightness of the frame (frame average luminance). The frame average luminance holding section 206 temporarily holds the calculated frame average luminance.

The difference calculation section 207 receives the block average luminances held by the block average luminance holding section 202, the line average luminances held by the line average luminance holding section 204, and the frame average luminance held by the frame average luminance holding section 206.

The difference calculation section 207 sequentially calculates the difference between each block average luminance and the frame average luminance and the difference between each line average luminance and the frame average luminance. The difference calculation section 207 calculates absolute values of the differences and outputs the same as difference values.

The difference values calculated by the difference calculation section 207 are inputted to the flash determination section 208. The flash determination section 208 determines whether or not the difference value between each line average luminance and the frame average luminance is equal to or greater than a set threshold value (a threshold value 1).

If the difference value between each line average luminance and the frame average luminance is equal to or greater than the threshold value, the flash determination section 208 then determines whether or not the difference value between each block average luminance and the frame average luminance is equal to or greater than a threshold value (a threshold value 2). The threshold values 1 and 2 may be different from each other.

In the case of setting the threshold values 1 and 2 different from each other, it is preferable that the threshold value 2 is larger than the threshold value 1.

The flash determination section 208 determines whether or not at least a predetermined number of consecutive lines have line difference values equal to or greater than the threshold value 1 and have block difference values equal to or greater than the threshold value 2.

If it is determined that at least the predetermined number of consecutive lines have line and block difference values equal to or greater than the threshold value 1 and 2, respectively, the flash determination section 208 determines discontinuous image brightness due to a flash.

If it is determined that there is a flash, the flash determination section 208 outputs: data indicating the start time of the flash as given by the number of the first line that has a line difference value equal to or greater than the threshold value 1 and includes blocks each having a block difference value equal to or greater than the threshold value 2; and data indicating the number of the first line that does not satisfy at least one of the conditions that the line difference value is equal to or greater than the threshold value 1 and each block difference value is equal to or greater than the threshold value 2.

The flash determination unit 208 also outputs the detection signal indicating that a flash has been detected.

Figure 13A:
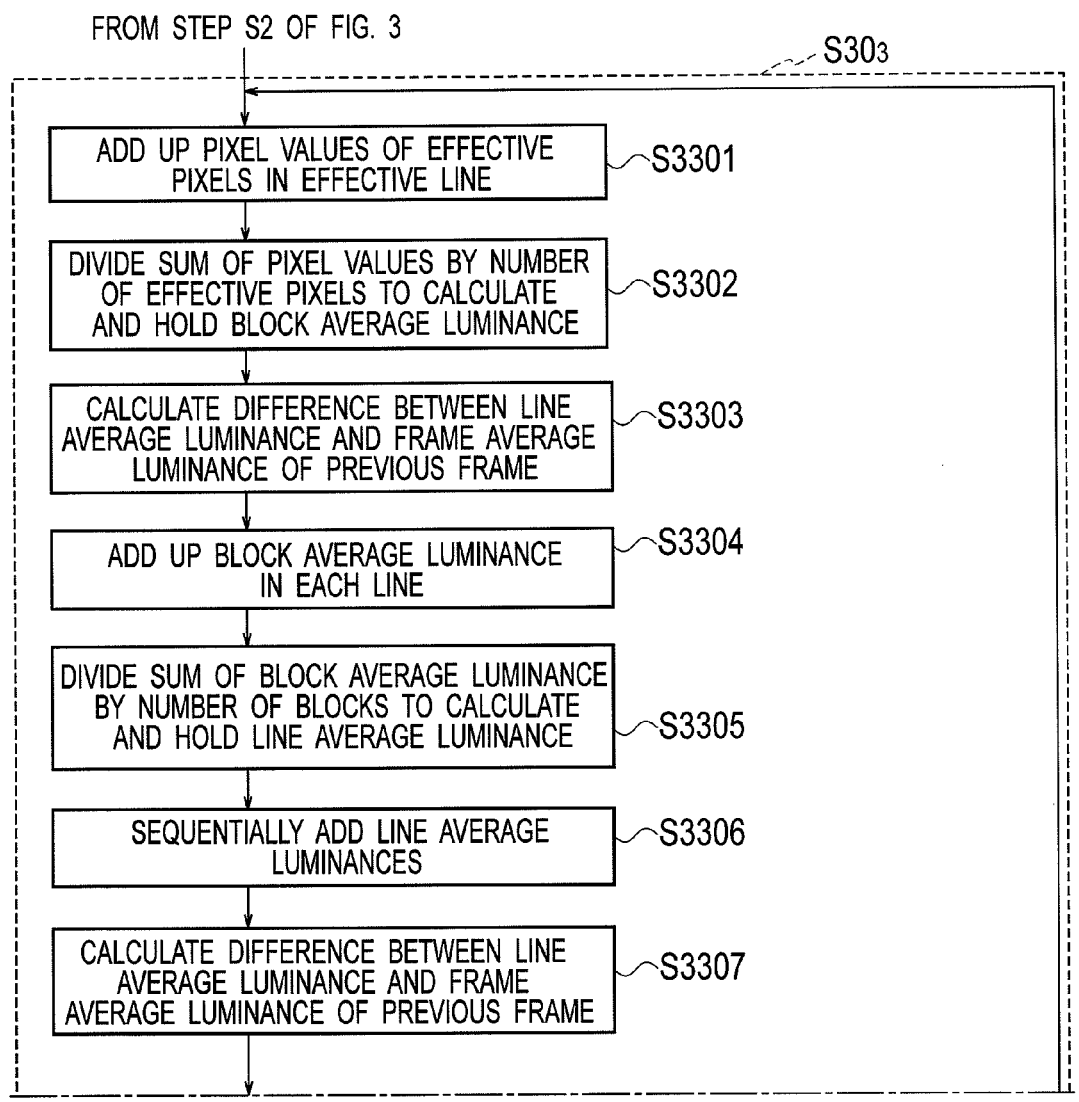
FIGS. 13A and 13B are a flowchart showing details of flash detection processing in the third embodiment.
Figure 13B:
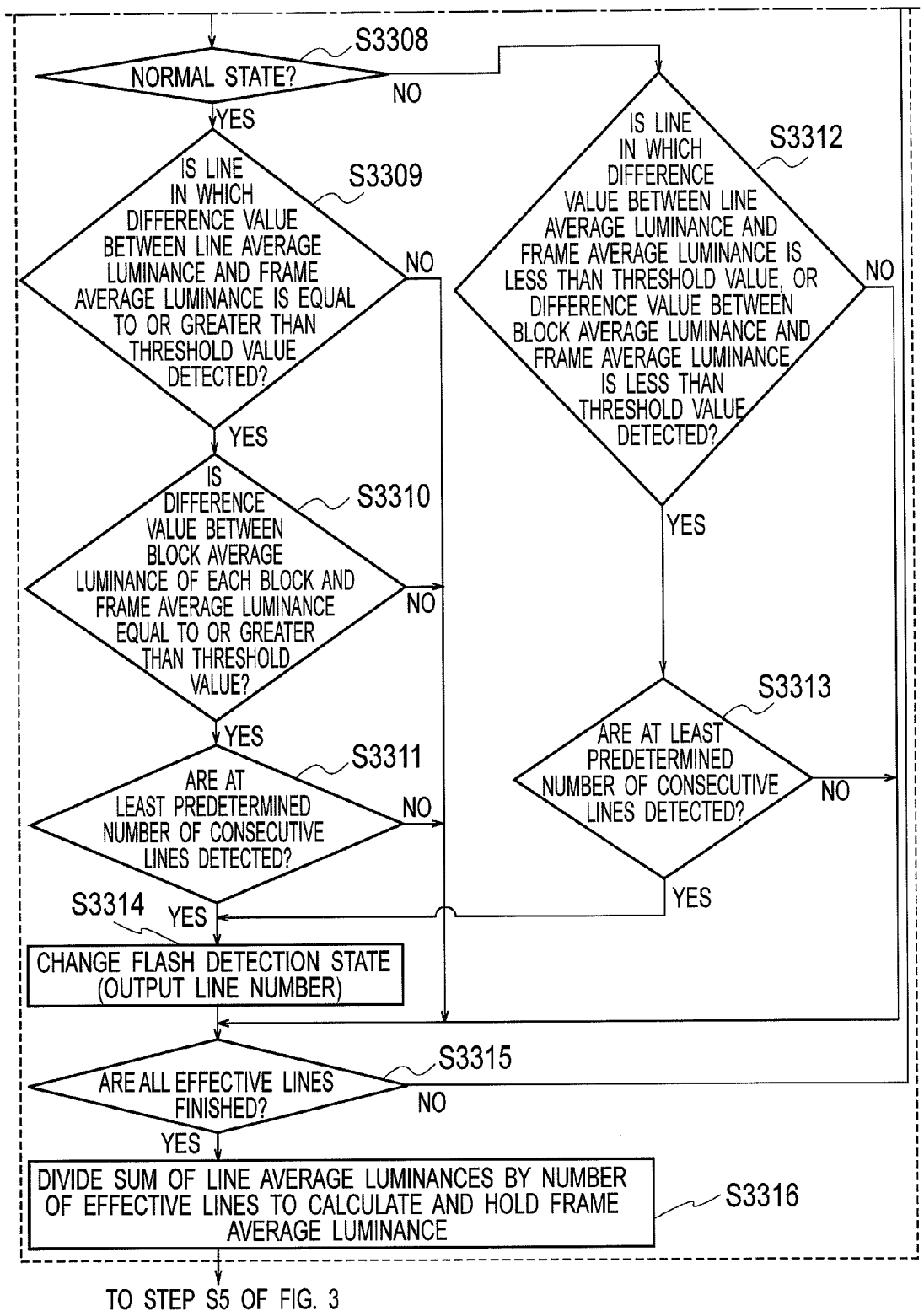

In the third embodiment, the flash detection processes of step 30 shown in FIG. 3 correspond to the processes of step S30$_3$ shown in FIGS. 13A and 13B. The flash detection processes of step S30$_3$ are described in detail with reference to FIGS. 13A and 13B. The following steps are executed by the flash detection unit 20 based on control by the controller 9.

In step S3301, in FIG. 13A, the flash detection unit 20 sequentially executes the process of adding up pixel values of the effective pixels of each block of effective lines, effective line by effective line.

In step S3302, the flash detection unit 20 divides the sum of the pixel values in each block, which is obtained in step S3301, by the number of effective pixels in the block to calculate the block average luminance thereof and holds the calculated block average luminance.

In step S3303, the flash detection unit 20 executes the process of calculating the difference between each block average luminance, which is calculated in step S3302, and the frame average luminance of the previous frame. The difference calculation process of step S3303 is executed each time the block average luminance is calculated in step S3302.

In step S3304, the flash detection unit 20 adds up the block average luminances of each line, and in step S3305, divides the sum of the block average luminances by the number of blocks in the line to calculate the line average luminance for each line. The flash detection unit 20 then holds the calculated line average luminances.

In step S3306, the flash detection unit 20 executes the process of sequentially adding up the line average luminances. In step S3307, the flash detection unit 20 executes the process of calculating the difference between each line average luminance, which is calculated in step S3305, and the frame average luminance of the previous frame. The difference calculation process of step S3307 is executed each time the line average luminance is calculated in step S3305.

In step S3308, in FIG. 13B, the flash detection unit 20 determines whether or not the current state is a normal state in which a flash has not been detected. If it is determined that it is a normal state (YES), in step S3309, the flash detection unit 20 determines whether or not a line for which the difference value between the line average luminance and the frame average luminance is equal to or greater than the threshold value (threshold value 1) is detected.

If it is determined that a line for which the difference value between the line average luminance and the frame average luminance is equal to or greater than the threshold value is detected (YES), the flash detection unit 20 moves the process to step S3310.

If it is not determined that a line for which the difference value between the line average luminance and the frame average luminance is equal to or greater than the threshold value is detected (NO), the flash detection unit 20 moves the process to step S3315.

If a line for which the difference value between the line average luminance and the frame average luminance is equal to or greater than the threshold value is not detected, it is determined that no flash has been detected.

If a line for which the difference value between the line average luminance and the frame average luminance is equal to or greater than the threshold value is detected, in step S3310 the flash detection unit 20 further determines whether or not the difference value between the block average luminance of each block in the line and the frame average luminance is equal to or greater than the threshold value (threshold value 2)

If it is determined that the difference value between the block average luminance of each block and the frame average luminance is equal to or greater than the threshold value (YES), the flash detection unit 20 moves the process to step S3311. At this time, the flash detection unit 20 stores detected line information indicating how many lines there are from the first line of the frame to the detected line.

If it is not determined that the difference value between the block average luminance of each block and the frame average luminance is equal to or greater than the threshold value (NO), the flash detection unit 20 deletes the detected line information already stored and moves the process to step S3315.

In step S3311, the flash detection unit 20 determines whether or not at least the predetermined number of consecutive lines satisfy each of the two conditions, in which the difference value between the line average luminance and the frame average luminance is equal to or greater than the threshold value, and the difference value between the block average luminance of each block and the frame average luminance is equal to or greater than the threshold value. The state satisfying these two conditions is referred to as a particular state.

If it is determined that at least the predetermined number of consecutive lines are in the particular state (YES), the flash detection unit 20 moves the process to step S3314. If it is not determined that at least the predetermined number of consecutive lines are in the particular state (NO), the flash detection unit 20 moves the process to step S3315.

In step S3314, the flash detection unit 20 changes the flash detection state from the state in which a flash is not detected to the state in which a flash is detected. Furthermore, the flash detection unit 20 supplies the stored detected line information to the flash correction unit 80 and deletes the detected line information.

On the other hand, in step S3308, if it is not determined that it is a normal state (NO), in step S3312, the flash detection unit 20 determines whether or not a line for which the difference value between the line average luminance and the frame average luminance is less than the threshold value, or for which the difference value between the block average luminance of each block and the frame average luminance is less than the threshold value is detected.

If it is determined that at least one of the above conditions is satisfied (YES in step S3312), the flash detection unit 20 moves the process to step S3313. At this time, the flash detection unit 20 stores detected line information indicating how many lines there are from the first line of the frame to the detected line.

If it is not determined that at least one of the above conditions is satisfied (NO in step S3312), the flash detection unit 20 moves the process to step S3315.

In step S3313, the flash detection unit 20 determines whether or not at least a predetermined number of consecutive lines do not satisfy at least one of the above conditions.

If it is determined that at least the predetermined number of consecutive lines do not satisfy at least one of the above conditions (YES), the flash detection unit 20 moves the process to step S3314.

If it is not determined that at least the predetermined number of consecutive lines do not satisfy at least one of the above conditions (NO), the flash detection unit 20 moves the process to step S3315.

In step S3314, the flash detection unit 20 changes the flash detection state from the state in which a flash is detected to the state in which a flash is not detected. Furthermore, the flash detection unit 20 supplies the stored detected line information to the flash correction unit 80, and deletes the detected line information.

In step S3315, the flash detection unit 20 determines whether or not the determination is finished for all of the effective lines. If it is determined that the determination is finished for all of the effective lines (YES), the flash detection unit 20 moves the process to step S3316. If it is not determined that the determination is finished for all of the effective lines (NO), the flash detection unit 20 returns the process to step S3301 and repeats step S3301 and subsequent steps.

In step S3316, the flash detection unit 20 divides the sum of the line average luminances by the number of effective lines in the frame to calculate the frame average luminance and holds the calculated frame average luminance.

Figure 14:
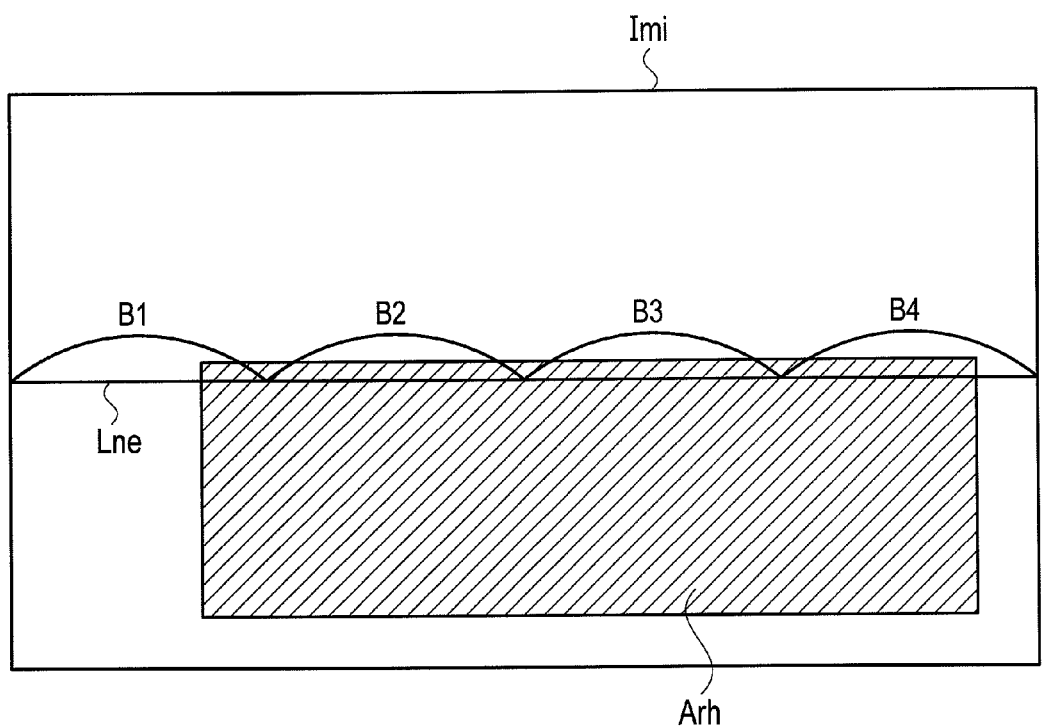
FIG. 14 is a view for explaining an advantage of the third embodiment.

The third embodiment can improve the accuracy of flash detection compared to the first and second embodiments A description follows of the reason why the detection accuracy is improved by using FIG. 14.

FIG. 14 shows an example of an image Imi having a frame partially including a high luminance rectangular area Arh. It is assumed that the hatched high luminance area Arh has a luminance the level of white, for example. The high luminance area Arh is not necessarily rectangular.

For an effective line Lne, the line average luminance is comparatively high. The lines other than the effective line Lne in the vertical range of the part where the high luminance area Arh exists have also high line average luminance.

Accordingly, in the first embodiment, it can be incorrectly determined that there is a flash in the vertical range of the part in which the high luminance area Arh exists.

In the example shown in FIG. 14, one line is divided into four blocks B1 to B4. The block average luminance of block B1, which is calculated by the block average calculation section 201, is not so high. Blocks B2 and B3 have high block average luminance, and block B4 has a block average luminance lower than that of blocks B2 and B3.

Concerning the effective line Lne, even if it is determined in step S3309 of FIG. 13B that the difference value between the line average luminance and the frame average luminance is equal to or greater than the threshold value, it is not determined, at least for block B1, that the difference value between the block average luminance of each block and the frame average luminance is equal to or greater than the threshold value in step S3310.

According to the third embodiment, therefore, it is possible to considerably reduce the possibility of erroneous determination of a flash even in image Imi partially including the high luminance area Arh as shown in the example of FIG. 14.

The third embodiment has the same advantages as the first and second embodiments due to the configuration having the flash correction unit 8. Furthermore, the third embodiment has an advantage that it can improve the detection accuracy of a flash due to the configuration having the flash detection unit 20 instead of the flash detection unit 2.

Fourth Embodiment

The configuration of the fourth embodiment of the image processing device is identical to the video camera 101 of the first embodiment shown in FIG. 1 or to the video camera 103 of the third embodiment shown in FIG. 12. The fourth embodiment is configured to display the image data on the display unit 7 without correction, even though it has a high luminance portion due to a flash, and to record the image data corrected by the flash correction unit 8 to the recording/reproduction unit (recording unit) 11.

FIG. 15 explains the operation of the video camera of the fourth embodiment. In FIG. 15, the same steps as those of FIG. 3 or 9 are given the same reference numerals, and the description thereof is omitted. Steps S1, S2, S4-S6, and S30 in FIG. 15 are identical to those in FIG. 3 or 9. As shown in FIG. 15, in step S134 after step S6, the controller 9 determines whether or not there is a flash detected region.

If it is determined that there is a flash detected region (YES), in step S144, the controller 9 executes the flash correction process by the flash correction unit 8, and moves the process to step S7.

If it is not determined that there is a flash detected region (NO), the controller 9 moves the process to step S7. In step S7, the controller 9 ensures that the encoded data outputted from the compression/decompression processing unit 5 is recorded to the recording/reproduction unit 11. Steps S8-S10 in FIG. 15 are identical to those in FIG. 3 or 9.

The flash correction process in step S144 may be any one of the processes shown in FIG. 6, 8, or 11.

The fourth embodiment records the corrected image data as shown in FIG. 6, 8, or 11 to the recording/reproduction unit 11. Therefore, image data in which the feeling of strangeness due to a flash has been reduced can be reproduced, without spoiling the state in which a flash has deliberately been used.

Fifth Embodiment

The configuration of the fifth embodiment of the image processing device is identical to the video camera 101 of the first embodiment shown in FIG. 1 or to the video camera 103 of the third embodiment shown in FIG. 12.

The fifth embodiment is configured to display the image data corrected by the flash correction unit 8 on the display unit 7, when a flash is detected by the flash detection unit 2 or 20, and to record the corrected image data to the recording/reproduction unit 11.

FIG. 16 explains the operation of the fifth embodiment. In FIG. 16, the same steps as those of FIG. 3, 9, or 15 are given the same reference numerals, and the description thereof is omitted. FIG. 16 shows the process in the case that the image processing device is configured to the same configuration as the video camera 101 having the flash detection unit 2 of FIG. 1.

In step S305 after step S2, in FIG. 16, the controller executes the flash detection process by the flash detection unit 2 and the flash correction process by the flash correction unit 8. The controller 9 instructs the image signal processing unit 3 to execute the image signal processing in step S4 in parallel to the step S305. The flash correction process by step S305 is any one of the processes shown in FIG. 6, 8, or 11.

In step S5, the controller 9 controls and instructs the output signal processing unit 6 to display the image, in which the flash correction processing has been applied by the flash correction unit 8, on the display unit 7.

In step S6, the controller 9 determines whether or not there is an instruction by the operation switch 12 to start recording. If it is determined that there is an instruction to start recording (YES), in step 7, the controller 9 instructs the recording/reproduction unit 11 to record the encoded data in which the flash correction processing has been applied by the flash correction unit 8 and compressed by the compression/decompression processing unit 5.

The image data in which the flash correction processing has been applied by the flash correction unit 8 is stored in the buffer memory 4 and compressed by the compression/decompression processing unit 5.

If it is not determined that there is an instruction to start recording (NO), the controller 9 moves the process to step S10.

In step S8, the controller 9 determines whether or not there is an instruction to terminate recording.

If it is determined that there is an instruction to terminate recording (YES), in step S9, the controller 9 stops recording to the recording/reproduction unit 11.

If it is not determined that there is an instruction to terminate recording (NO), the controller 9 returns the process to step S7 and repeats step S7.

In step S10, the controller 9 determines whether or not there is an instruction by the operation switch 12 to terminate shooting. If it is determined that there is an instruction to terminate shooting (YES), the controller 9 terminates the process. If it is not determined that there is an instruction to terminate shooting (NO), the controller 9 returns the process to step S2 and repeats step S2 and subsequent steps.

According to the fifth embodiment, because the corrected image data shown in FIG. 6, 8, or 11 is displayed on the display unit 7, it is possible to confirm image data in which the feeling of strangeness due to a flash has been reduced.

Furthermore, as is the same for the fourth embodiment, because the corrected image data is recorded on the recording/reproduction unit 11, image data in which the feeling of strangeness due to a flash is reduced can be reproduced, without spoiling the state in which a flash has deliberately been used.

As described above, according to the first to fifth embodiments, the reduction in strangeness is achieved without spoiling images which have been taken under the circumstance where a flash has deliberately been used.

The above described first to fifth embodiments also have the following advantages. According to the flash detection unit 2 or 20, a flash can be detected with fewer false positives. However, when the entire frame is bright, even though there is not a flash, there is a possibility of false detection.

In the first to fifth embodiments, partial portions of image data in a plurality of frames are consolidated and a combined frame is generated. Therefore, due to generating the combined frame, the feeling of strangeness does not occur even when a bright image not caused by a flash is mistakenly detected as a flash.

The first to fifth embodiments have the advantage that when correcting image data it is difficult to adversely affect the image, even when a false detection of a flash occurs.

The present invention is not limited to the above-described embodiments and can be variously changed without departing from the scope of the invention. Each embodiment is described with a video camera as an example.

However, the image processing device and method of the present invention are applicable to arbitrary electronic devices which handle image data. For example, the image processing device of each embodiment may be mounted on an image display device with an information processing apparatus such as a computer to correct image data, including a frame partially having high luminance inside the image display device or information processing device.

In the configuration of each embodiment, video data which is already processed by the image signal processing unit 3 is corrected.

However, in the embodiments, video data which is not yet processed by the image signal processing unit 3 may be corrected.

Moreover, in the configuration of each embodiment, the buffer memory 4 is used which is separately provided from the image signal processing unit 3 and the compression/decompression processing unit 5.

However, the buffer memory 4 may be a buffer memory used in the image signal processing unit 3 or compression/decompression processing unit 5, and the circuit (block) configuration can be appropriately changed.

The image processing device and method of the present invention can be realized by a computer program (image processing program). The image processing program may be recorded on a provided computer-readable recording medium or may be delivered through a communication line such as the Internet.

The image processing program recorded in the recording medium or the image processing program delivered through a communication line, may be stored in the image processing device and instructed to execute the aforementioned image processing method.

What is claimed is:

1. An image processing device comprising:
   a flash detection unit configured to detect whether or not each frame of image data includes a high luminance portion due to a flash;
   a holding unit configured to hold a past frame of the image data; and
   a correction processing unit configured to correct the image data, if the flash detection unit detects that the frames include high luminance portions, so as to consolidate a first image data and a second image data into one frame, the first image data being included in a first portion in a first frame stored in the holding unit, the second image data being included in a second portion in a second frame, which is adjacent to the first frame, the first and second portions being high luminance portions, wherein
   the flash detection unit includes:
   a block average luminance calculation section configured to calculate a block average luminance of each block of the multiple blocks which are obtained by dividing each line of a target frame;
   a line average luminance calculation section configured to calculate a line average luminance of each line of the target frame, the line average luminance based on the block average luminances of each line calculated by the block average luminance calculation section;
   a frame average luminance calculation section configured to calculate a frame average luminance of the past frame, the frame average luminance based on the line average luminances of each line of the past frame calculated by the line average luminance calculation section;
   a difference calculation section configured to calculate a difference value between each block average luminance and the frame average luminance and a difference value between each line average luminance and the frame average luminance; and
   a flash determination section configured to determine that some lines in the target frame are high luminance, provided that at least a predetermined number of consecutive lines are in a particular state, the particular state being a state in which the difference between the line average luminance and the frame average luminance is equal to or greater than a first threshold value and the difference between each block average luminance and the frame average luminance is equal to or greater than a second threshold value.

2. The image processing device according to claim 1, further comprising a recording/reproduction unit configured to record and reproduce image data, wherein the correction processing unit corrects the image data reproduced from the recording/reproduction unit.

3. The image processing device according to claim 1, further comprising a recording unit configured to record the image data corrected by the correction processing unit.

4. The image processing device according to claim 1, wherein when a combined portion formed by combining the first and second portions makes an entire portion equal to or greater than the size of one frame, the correction processing unit corrects the image data so as to consolidate the first image data and the second image data into one frame.

5. An image processing method, comprising:
   detecting whether or not each frame of image data includes a high luminance portion due to a flash;
   holding a past frame of the image data in a holding unit; and
   if it is detected that the frames include high luminance portions, correcting the image data so as to consolidate a first image data and a second image data into one frame, the first image data being included in a first portion in a first frame stored in the holding unit, the second image data being included in a second portion in a second frame which is adjacent to the first frame, the first and second portions being high luminance portions, wherein
   the image processing method further comprises:
   calculating a block average luminance of each block of the multiple blocks which are obtained by dividing each line of a target frame;
   calculating a line average luminance of each line of the target frame, the line average luminance based on the block average luminances of each line;
   calculating a frame average luminance of the past frame, the frame average luminance based on the line average luminances of each line of the past frame;
   calculating a difference value between each block average luminance and the frame average luminance and a difference value between each line average luminance and the frame average luminance; and
   determining that some lines in the target frame are high luminance, provided that at least a predetermined number of consecutive lines are in a particular state, the particular state being a state in which the difference between the line average luminance and the frame average luminance is equal to or greater than a first threshold value and the difference between each block average luminance and the frame average luminance is equal to or greater than a second threshold value.

6. The image processing method according to claim 5, wherein correcting the image data so as to consolidate a first image data and a second image data into one frame is performed when a combined portion formed by combining the first and second portions makes an entire portion equal to or greater than the size of one frame.

* * * * *